Feb. 15, 1966 W. H. MASHINTER 3,234,926
METHOD AND APPARATUS FOR SUPPLYING FUEL
Filed April 19, 1963 11 Sheets-Sheet 2
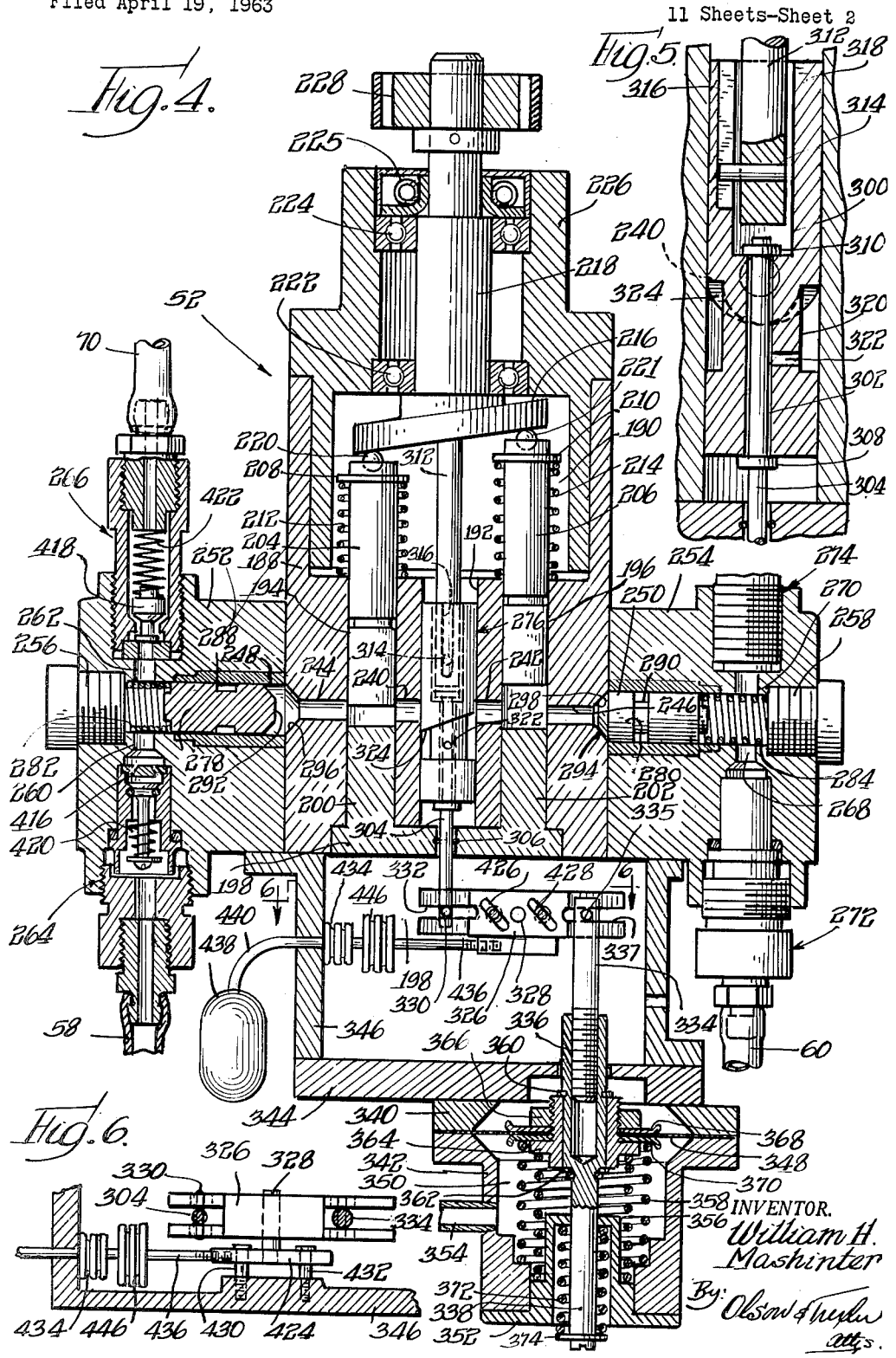
INVENTOR.
William H. Mashinter
By Olson & Trexler
attys.

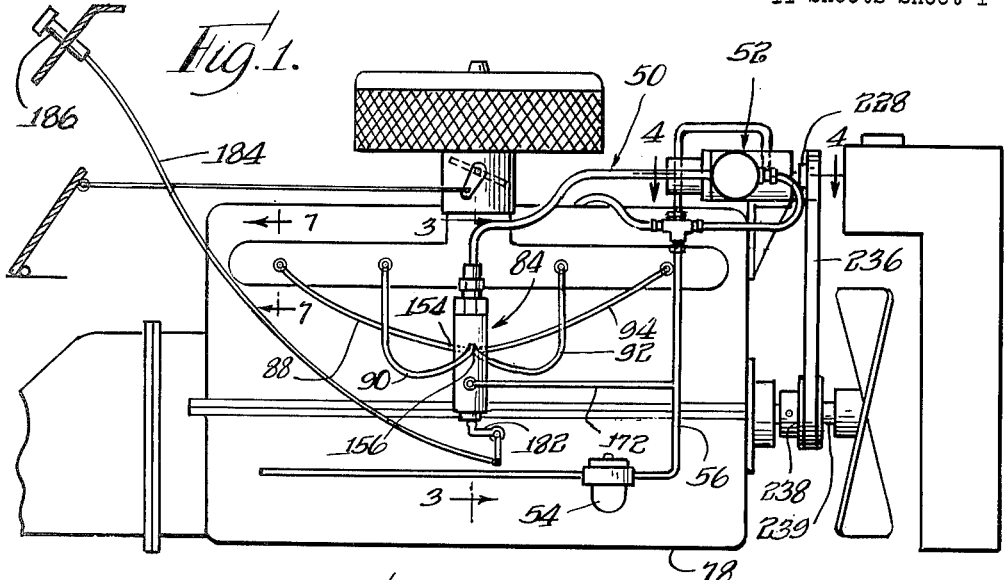
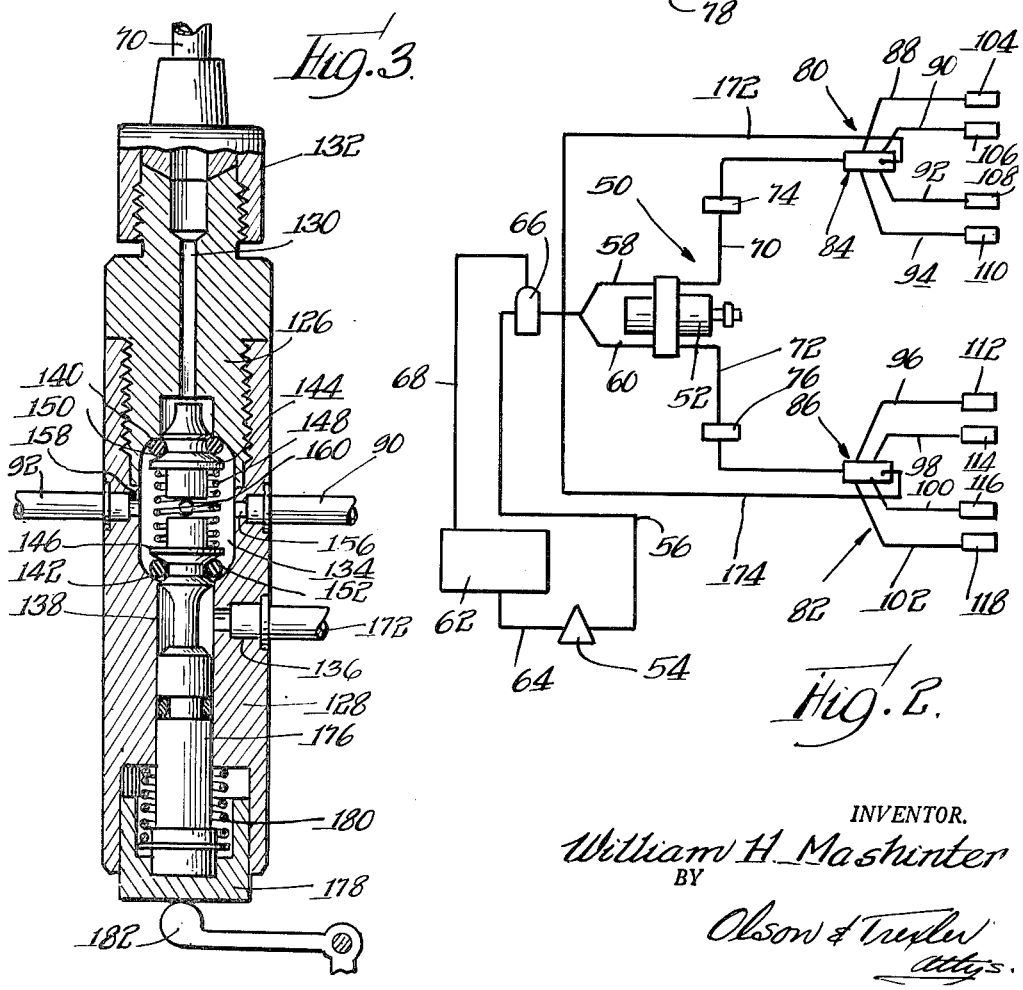

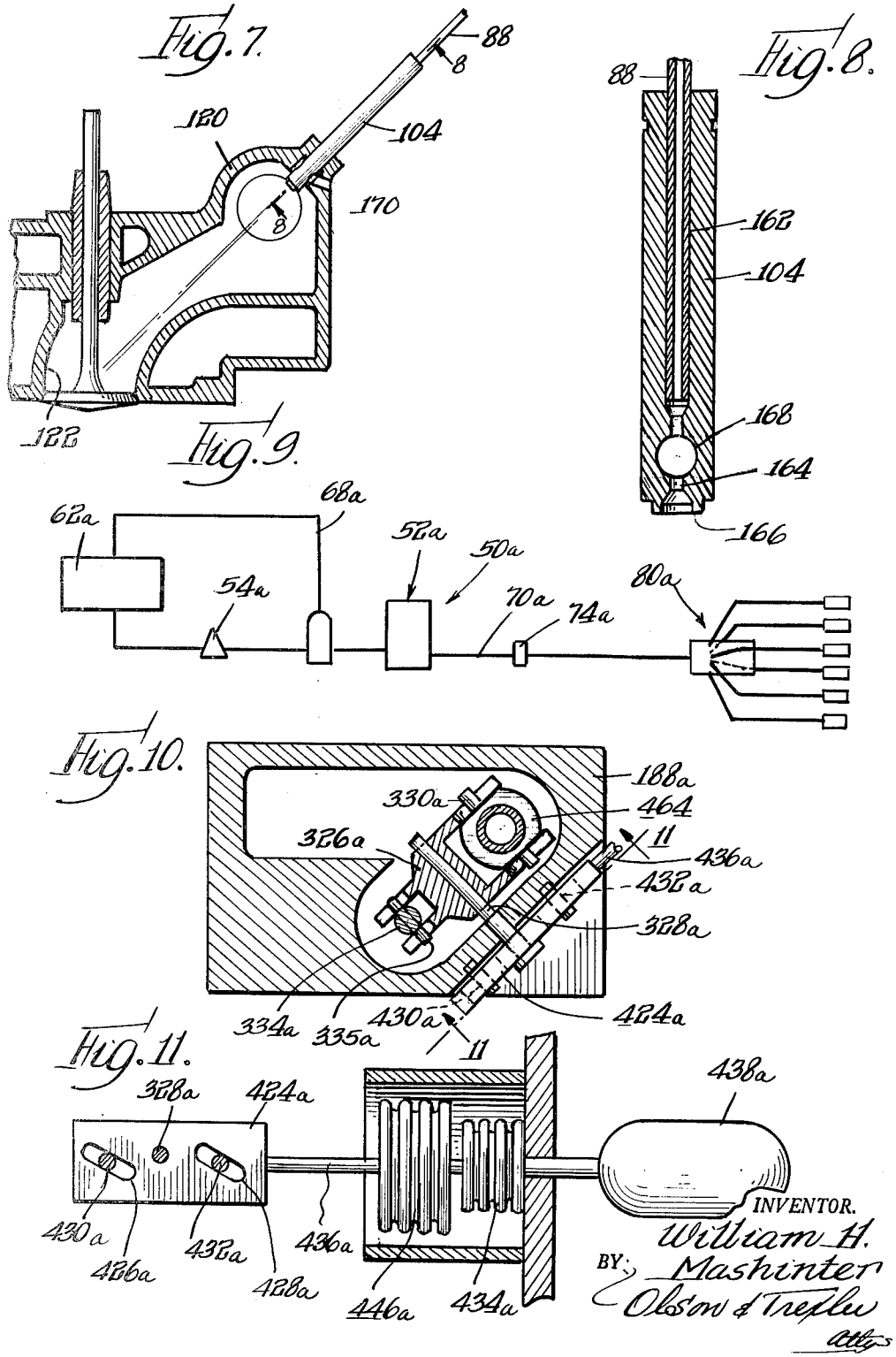

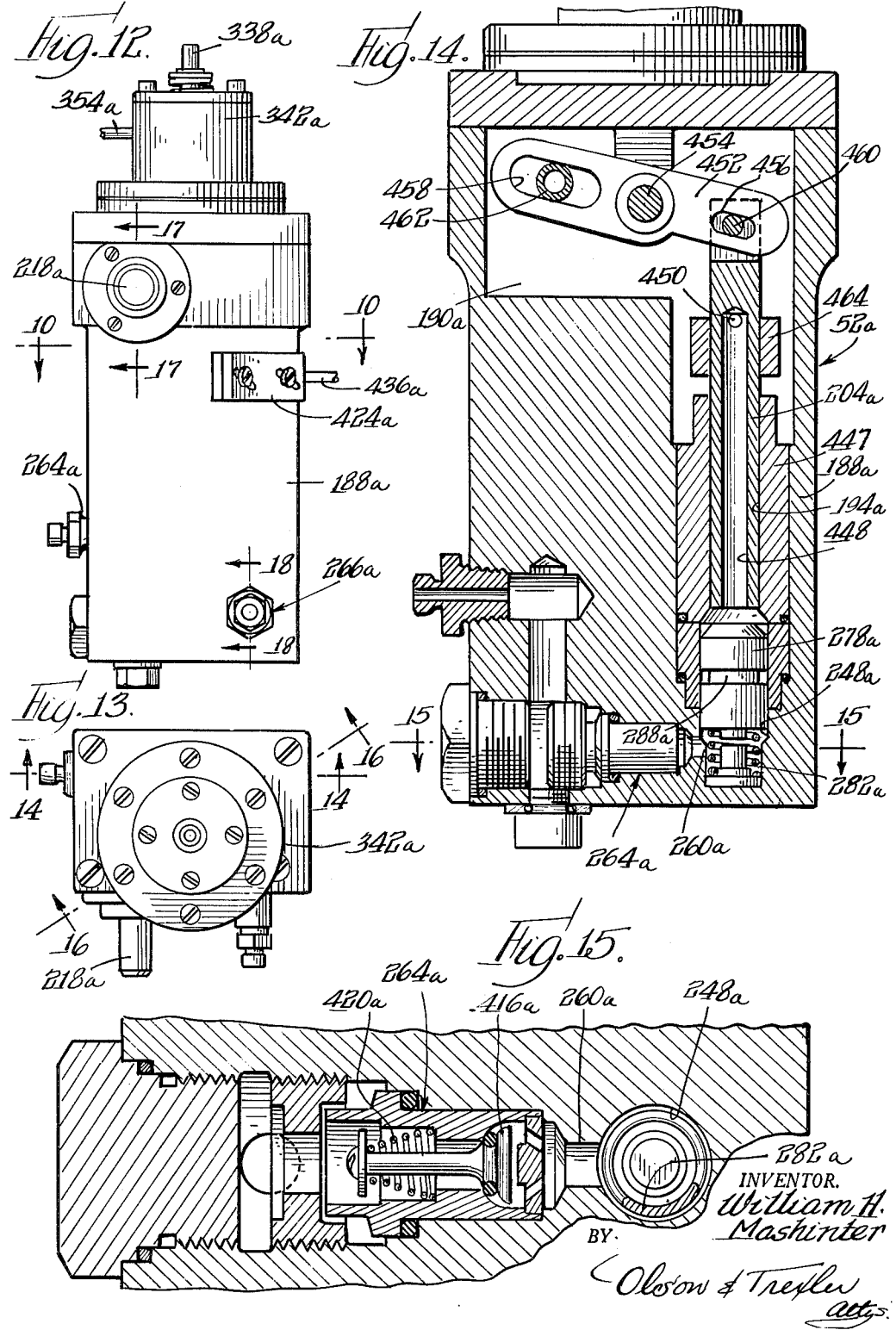

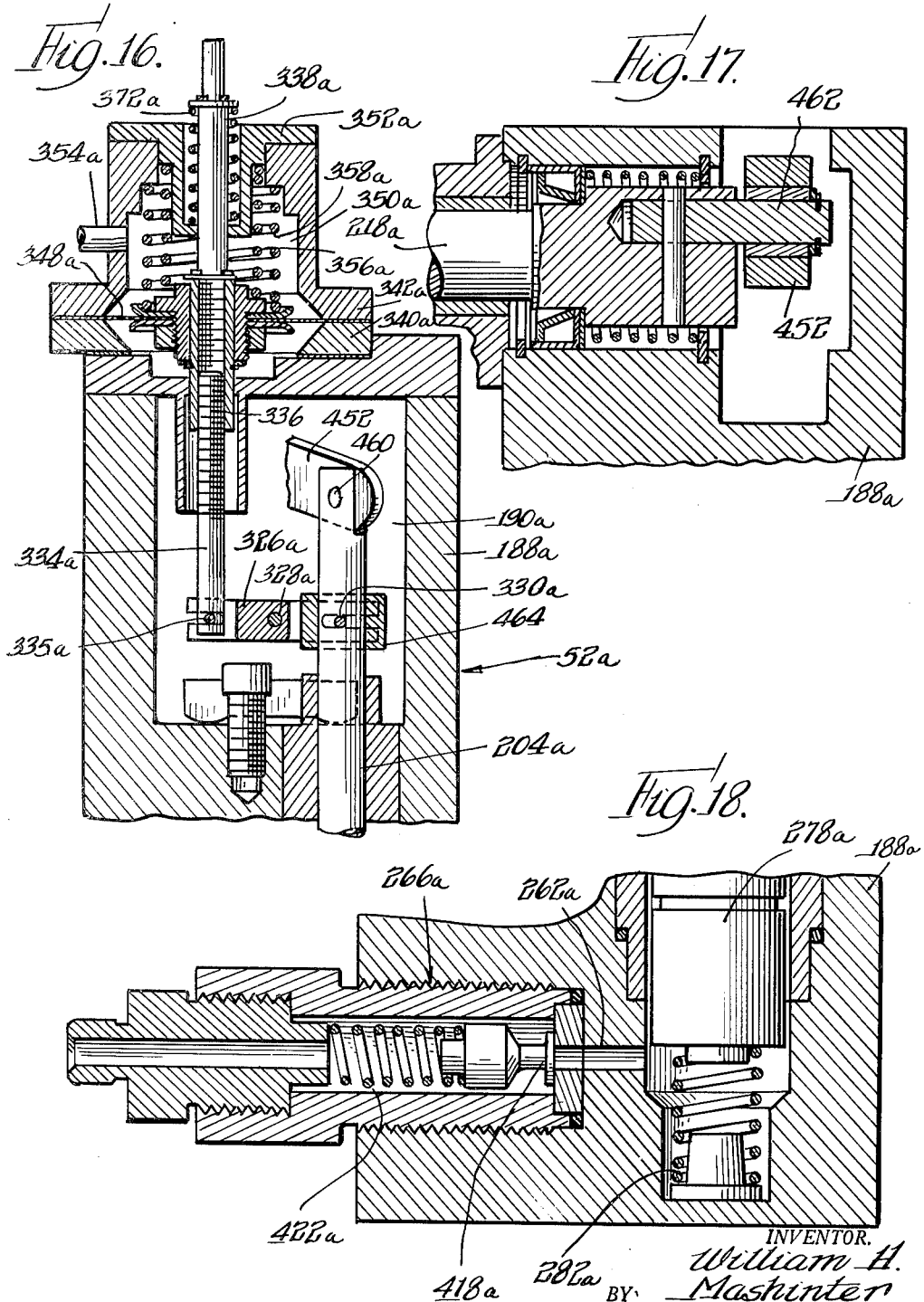

Feb. 15, 1966 W. H. MASHINTER 3,234,926
METHOD AND APPARATUS FOR SUPPLYING FUEL
Filed April 19, 1963 11 Sheets-Sheet 6
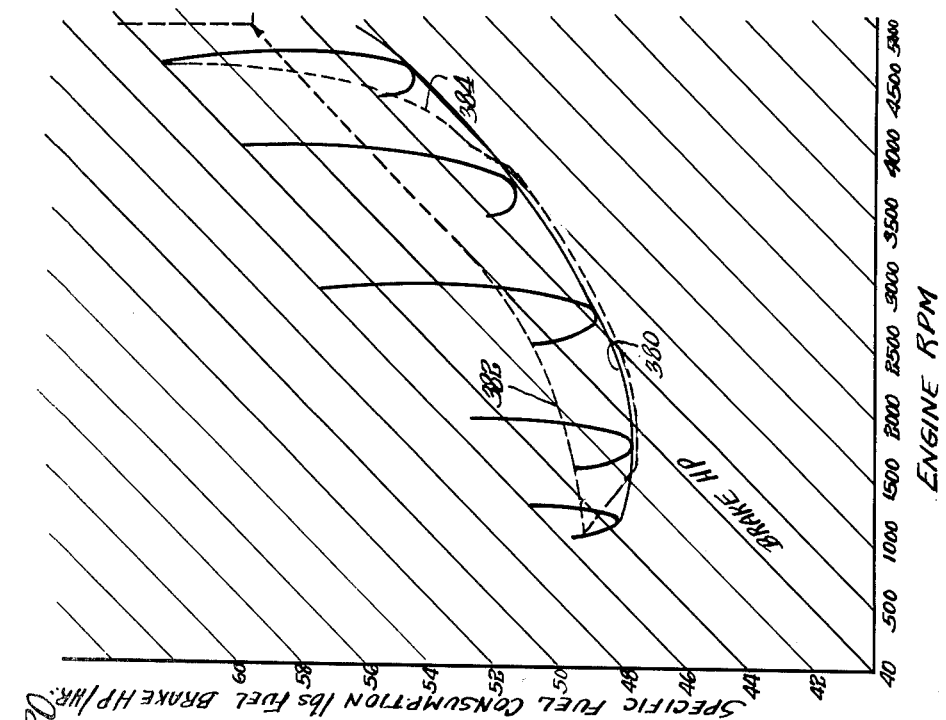
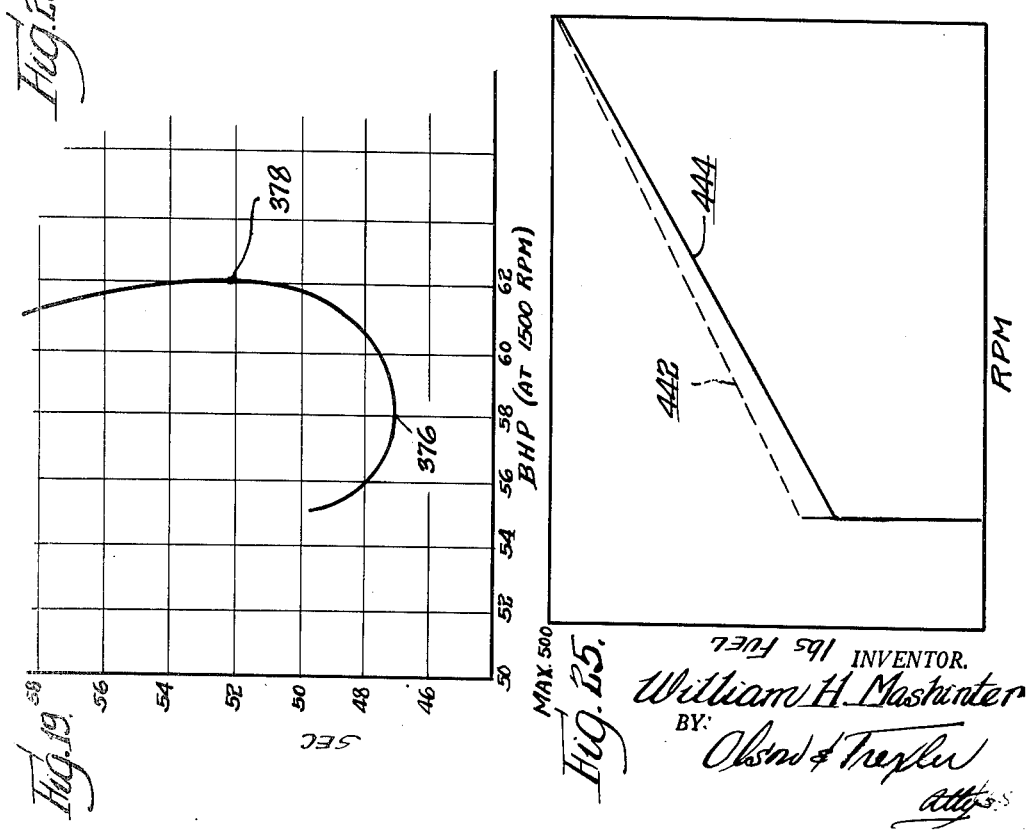
INVENTOR.
William H. Mashinter
BY:

INVENTOR.
William H. Mashinter

Feb. 15, 1966 W. H. MASHINTER 3,234,926
METHOD AND APPARATUS FOR SUPPLYING FUEL
Filed April 19, 1963 11 Sheets-Sheet 9

INVENTOR.
William H. Mashinter
BY
Olson & Trexler
Attys.

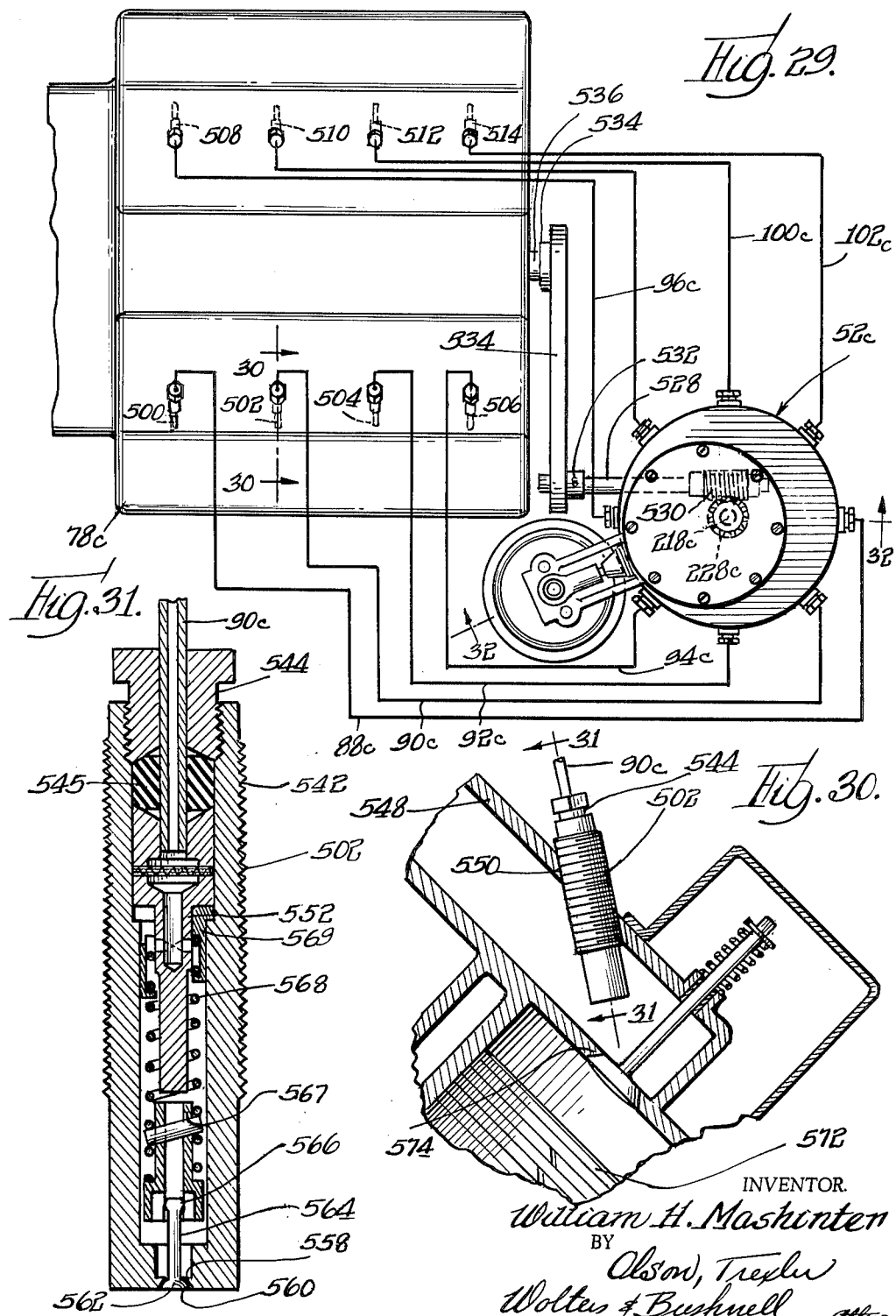

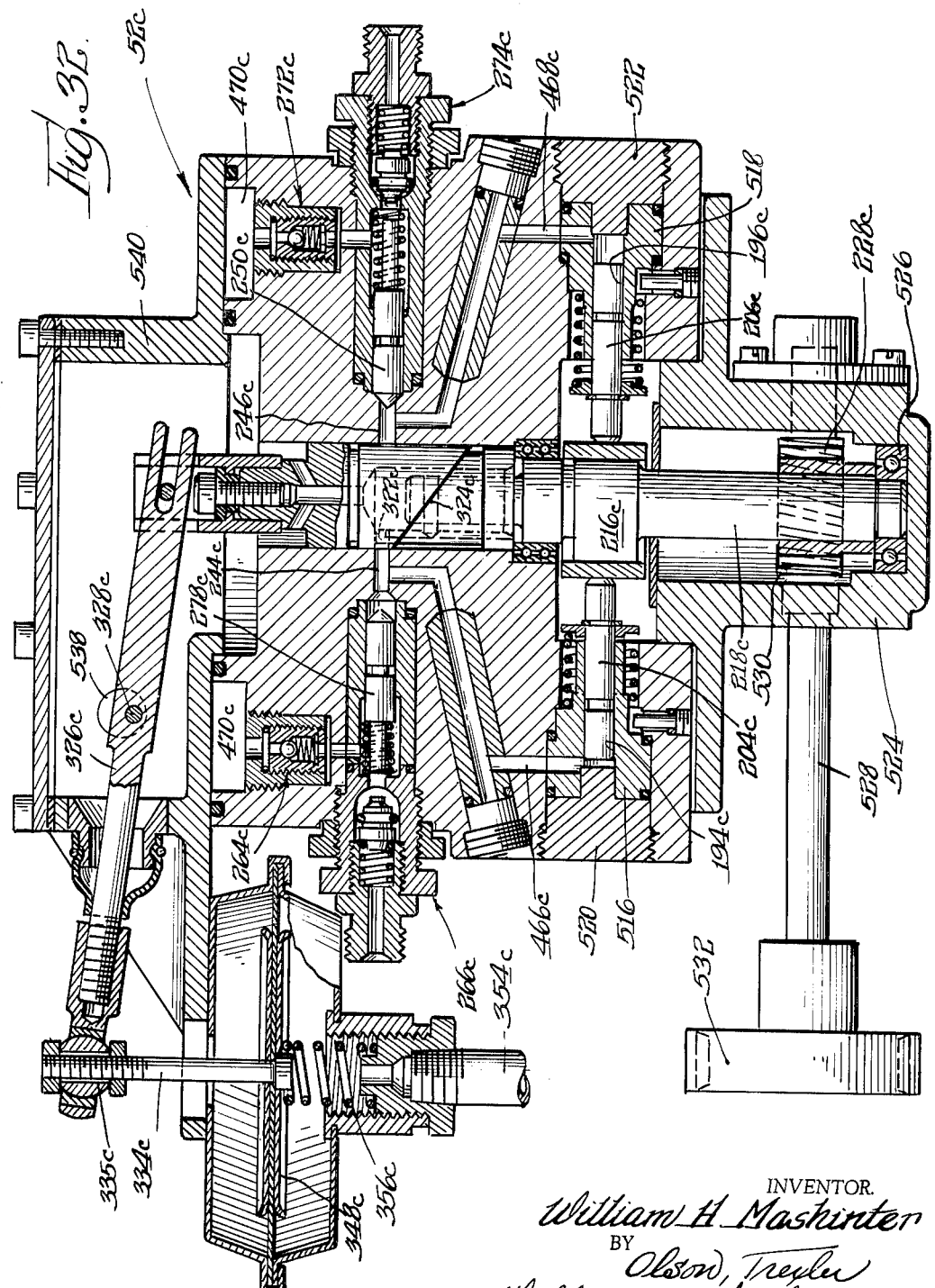

United States Patent Office 3,234,926
Patented Feb. 15, 1966

3,234,926
METHOD AND APPARATUS FOR
SUPPLYING FUEL
William H. Mashinter, Barrington, Ill.
(400 Maple Ave., Carpentersville, Ill.)
Filed Apr. 19, 1963, Ser. No. 274,292
13 Claims. (Cl. 123—139)

This is a continuation-in-part of my copending application Serial No. 67,317, filed November 4, 1960, now abandoned.

The present invention relates to a novel method and apparatus for supplying fuel to internal combustion engines. As will become apparent the method and apparatus of the present invention may be used in connection with internal combustion engines either in stationary installations or in land, water and air vehicles of substantially all types.

As is well known, most of the present internal combustion engines, particularly of the spark-ignition type, utilize a carburetor for preparing a combustible mixture of fuel and air which is then distributed to the various engine cylinders through an intake manifold. Numerous proposals have also heretofore been made for providing fuel injection systems in which charges of fuel are ejected from spray or atomizing nozzles usually directly into the engine cylinders. The carburetor systems have usually had the desirable characteristic of being relatively low in initial cost. However, the carburetor systems are relatively inefficient and frequently are unable to provide accurately the desired air to fuel ratios over a usual range of operating conditions or to provide even distribution of fuel to the various engine cylinders. Furthermore, it appears that previous systems have delivered the fuel to the engine in a manner such that relatively poor utilization of the available energy in the fuel is obtained.

Certain of the heretofore proposed fuel injection systems have been able to provide improvements in engine operating efficiency but have still resulted in relatively poor fuel utilization and at the same time, have created other problems. For example, heretofore available fuel injection systems have been quite expensive to manufacture and maintain, so that they have never been considered satisfactory for the mass markets. Furthermore, fuel injection systems have usually required extensive modifications in the head or block of presently available engines which, of course, would increase the cost of installation unduly.

It is an important object of the present invention to provide a novel method and apparatus for supplying fuel to an internal combustion engine in a manner which obtains substantial increase in the utilization of the available energy in the fuel.

Another important object of the present invention is to provide a novel fuel supply method and apparatus for internal combustion engines which will compare favorably with presently available carburetors as to installation costs and which at the same time provides improvements in operating characteristics and efficiencies over both heretofore proposed carburetor systems and fuel injection systems.

A further important object of the present invention is to provide a fuel supply method and apparatus whereby predetermined amounts of fuel may be delivered with greater uniformity to a plurality of engine cylinders in a more efficient and economical manner.

Still another important object of the present invention is to provide a novel fuel supply method and apparatus for an internal combustion engine whereby fuel is delivered to engine cylinders so as to enable a significant increase in power output from a given amount of fuel to be obtained.

Another object of the present invention is to provide a novel fuel supply method and apparatus for internal combustion engines whereby fuel is delivered to engine cylinders in a manner which increases the effective or apparent octane of the fuel.

A more specific object of the present invention is to provide a novel fuel delivery system for internal combustion engines which is capable of accurately maintaining a desired air to fuel ratio in the engine cylinders over a wide range of engine operating conditions and speeds and may, for example, maintain a first ratio at certain operating conditions and speeds for providing maximum efficiency and another ratio at other engine operating conditions and speeds for obtaining maximum power.

Still another object of the present invention is to provide a novel fuel supply system of the above described type which may be readily adjusted either manually or automatically for changes in various environmental conditions such as temperature, barometric pressure and the like.

Another object of the present invention is to provide a novel fuel supply system having characteristics and advantages mentioned hereinabove and particularly adapted to be supplied as a "bolt-on" system so that it may be easily and economically assembled with presently available engines either as original or replacement equipment.

A further specific object of the present invention is to provide a fuel supply system of the above described type having novel fuel pumping and metering means capable of accurately delivering measured amounts of fuel to a plurality of engine cylinders and over the full range of engine operating speeds and particularly from a relatively slow speed such as an idle speed to a relatively high top speed.

Still another specific object of the present invention is to provide a fuel supply system for internal combustion engines having novel pumping and metering means constructed so that an output curve thereof may be closely matched with an optimum operational curve of an engine with which the system is to be used for facilitating the maintenance of predetermined air to fuel ratios under certain engine operating conditions.

A more specific object of the present invention is to provide a novel fuel supply system for internal combustion engines comprising novel pumping and metering means constructed so as to enable fuel from a single pressure line to be accurately and evenly distributed to a plurality of cylinders.

Another object of the present invention is to provide a fuel supply system of the aforesaid type capable of supplying fuel on an emergency basis in the event of a breakdown in the above mentioned fuel pumping and metering means.

Other objects and advantages of the present invention will become apparent from the following description and the accompanying drawings wherein:

FIG. 1 is a somewhat simplified view showing a fuel supply system incorporating features of the present invention assembled with an internal combustion engine;

FIG. 2 is a schematic view of the system shown in FIG. 1;

FIG. 3 is an enlarged partial sectional view of one of the valve structures forming part of the system taken generally along line 3—3 in FIG. 1;

FIG. 4 is an enlarged partial sectional view of a pump structure forming part of the system, taken generally along line 4—4 in FIG. 1;

FIG. 5 is a further enlarged sectional view of a portion of the mechanism shown in FIG. 4;

FIG. 6 is a fragmentary sectional view taken generally along line 6—6 in FIG. 4;

FIG. 7 is a fragmentary partial sectional view of a part of the fuel supply system taken generally along line 7—7 in FIG. 1;

FIG. 8 is an enlarged sectional view taken generally along line 8—8 in FIG. 7;

FIG. 9 is a schematic view showing a system embodying a modified form of the present invention;

FIG. 10 is a sectional view taken generally along line 10—10 in FIG. 12;

FIG. 11 is a fragmentary sectional view taken generally along line 11—11 in FIG. 10;

FIG. 12 is an elevational view showing a pump structure incorporated in the system shown in FIG. 9;

FIG. 13 is a plan view of the pump structure shown in FIG. 12;

FIG. 14 is an enlarged partial sectional view taken generally along line 14—14 in FIG. 13;

FIG. 15 is a further enlarged partial sectional view taken along line 15—15 in FIG. 14;

FIG. 16 is an enlarged fragmentary sectional view taken generally along line 16—16 in FIG. 13;

FIG. 17 is an enlarged framentary sectional view taken generally along line 17—17 in FIG. 12;

FIG. 18 is an enlarged fragmentary sectional view taken along line 18—18 in FIG. 12;

FIG. 19 is a diagram showing a performance curve obtained by plotting specific fuel consumption in pounds of fuel per brake horsepower per hour against observed brake horsepower while an engine is operating at a constant speed;

FIG. 20 is a triaxial diagram showing a series of curves of the type shown in FIG. 19 obtained at different engine speeds;

FIG. 25 is a diagram illustrating the manner of compensating for changes in air density in accordance with the present invention by varying the amount of fuel delivered;

FIG. 26 is a schematic view showing another modified form of the present invention;

FIG. 27 is a partial vertical sectional view showing a metering pump structure incorporating features of the present invention and adapted to be used in the system of FIG. 26;

FIG. 28 is a sectional view taken along line 28—28 in FIG. 27;

FIG. 29 is a plan view showing a fuel supplying system incorporating another modified form of the present invention installed with an engine;

FIG. 30 is an enlarged fragmentary sectional view taken along line 30—30 in FIG. 29;

FIG. 31 is a further enlarged sectional view taken along line 31—31 in FIG. 30; and FIG. 32 is an enlarged partial sectional view taken generally along line 32—32 in FIG. 29.

Figure 21:
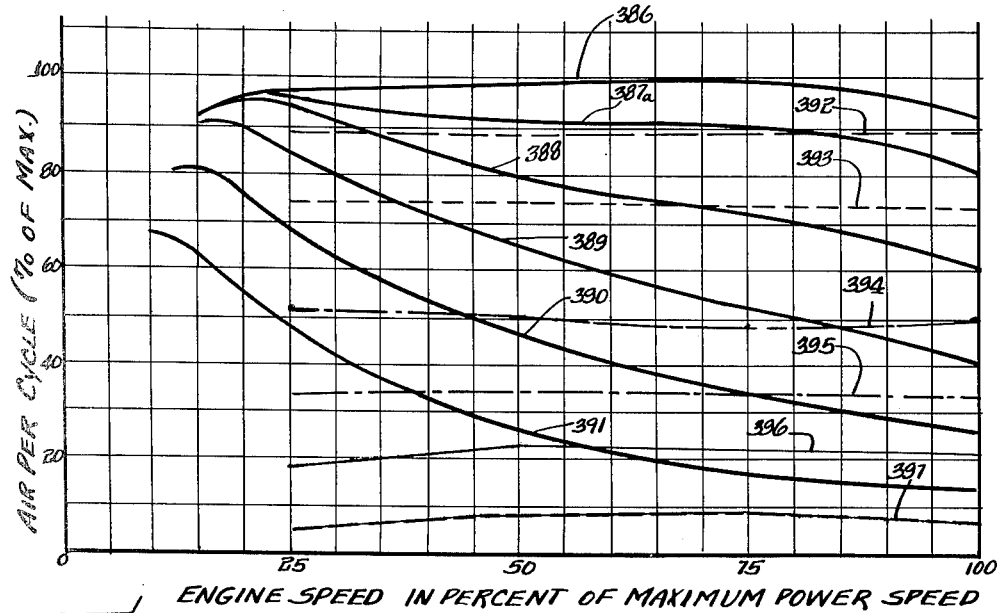
FIG. 21 is a diagram showing air intake of an engine at different engine speeds and at different throttle positions and conditions of manifold vacuum.

Referring now more specifically to the drawings wherein like parts are designated by the same numerals throughout the various figures, a system 50 incorporating features of the present invention is shown generally in FIGS. 1 and 2 and portions of this system are shown in detail in FIGS. 3–8. The system 50 comprises a pump unit 52 constructed in accordance with features of the present invention and adapted to deliver accurately metered quantities of fuel in the manner described in detail below. The pump unit 52 has inlet ports connected with a standard fuel transfer pump 54 by a conduit 56 and suitable branch conduits 58 and 60. The fuel transfer pump is, of course, connected with a suitable fuel tank 62 by conduit 64, and if desired, a filter and vapor trap 66 of known construction may be connected in the fuel line 56. A return line 68 extends from the filter and vapor trap to the reservoir tank 62.

The pump unit 52 includes features of a drive pump set forth in my co-pending applications Serial No. 750,-760, filed July 24, 1958 now U.S. Patent No. 3,070,030, and Serial No. 174,211, filed February 19, 1962, now U.S. Patent No. 3,172,368. The pump has two outlets respectively connected with separate discharge lines 70 and 72. As will be described more fully hereinbelow, the pump unit 52 is adapted to deliver high velocity jet-pulses providing intermittent streams of fuel. In certain instances it may be desirable to connect restrictive orifice members 74 and 76 in discharge lines 70 and 72 for restricting fluid flow, particularly when the pump is driven at higher speeds and tends to develop higher pressures. It is to be understood, however, that in certain installations the restrictive orifice members 74 and 76 may be omitted.

The system 50 is adapted to deliver and distribute the fuel to the various cylinders of an engine 78 in a manner so that each cylinder receives substantially the same amount of fuel. The system 50 shown in FIGS. 1 and 2 is constructed for application to an eight-cylinder engine and the discharge lines 70 and 72 are respectively connected with distributor means 80 and 82 which are adapted to direct the fuel to different groups of four cylinders. The distributor means 80 and 82 respectively include identical distributor valves 84 and 86. Elongated orifice tubes 88, 90, 92 and 94 are connected with outlets of the distributor valve 84 and identical orifice tubes 96, 98, 100 and 102 are connected with outlets of the distributor valve 86. The orifice tubes are, in the embodiment shown, respectively connected with identical end fittings 104, 106, 108, 110, 112, 114, 116 and 118 which are adapted to be mounted as shown in FIGS. 1 and 7, so as to extend through the wall of the intake manifold 120 of the engine 78 for directing fuel from the orifice tubes against surfaces in the intake valve pockets 122 associated with the various cylinders.

The metering pump 52 which will be described hereinafter in detail, is capable of delivering intermittent, pulsating high velocity jet streams of fuel to the discharge lines 70 and 72 and, in accordance with an important feature of the present invention, it has been found that by means of the features herein described these streams may be divided with great accuracy into equal parts for distribution to the engine cylinders. More specifically, the distributor valve 84 (the valve 86 being identical), is shown in detail in FIG. 3, and comprises complementary inter-connected body members 126 and 128. The body member 126 is provided with an axially extending inlet passageway 130 that communicates with the discharge conduit or line 70 which is connected with the body member by means of a suitable fitting 132. An inner end of the inlet passageway 130 opens into an enlarged chamber 134 provided between opposing ends of the body members 126 and 128. The body member 128 is provided with an auxilary inlet opening 136 for a purpose to be described hereinafter, which opening communicates with a central bore 138 that in turn opens into the chamber 134 oppositely from the passageway 130. The body members 126 and 128 respectively present annular valve seats 140 and 142 surrounding the openings of the passageways 130 and 138 into the central chamber 134. Check valve members 144 and 146 are disposed within the chamber 134 and are respectively urged toward the valve seats 140 and 142 by a compression spring 148 disposed therebetween. O-rings 150 and 152 are respectively carried by the valve members 144 and 146 for sealing engagement with the seats 140 and 142.

Outlet openings 154, 156, 158 and 160 are provided in the body member 128 at evenly spaced intervals therearound and communicate with an intermediate portion of the chamber 134. The orifice tubes 88, 90, 92 and 94 are connected with the body member 128 and respectively communicate with the discharge openings 154, 156, 158 and 160.

The orifice tubes 88, 90, 92 and 94 are constructed so that they provide substantially the same pressure drop. This may be accomplished by forming them with ordinary commercially available tubing so that they are substantially equal in length and so that they have substantially the same internal diameter. As indicated in FIG. 1, the various orifice tubes must necessarily be bent or looped in different manners for association with the engine cylinders. It has been found that such bends or loops do not prevent the system from evenly distributing fuel with a high degree of accuracy to the various cylinders.

The internal diameter of the orifice tubes is quite small and may, by way of example only, be on the order of 0.025 inch. It will be understood that the internal diameter of the orifice tubes may be varied in accordance with the requirements of a particular installation. However, it is necessary that the internal diameter of the orifice tubes be sufficiently small so as to provide a very substantial resistance to fluid flow therethrough which is sufficient in relation to pump delivery to prevent the high impulse pressures developed by the metering pump from being unduly relieved or, in other words, which is sufficient to cause each shock or impulse wave generated by the pump to travel substantially uniformly through the outlet openings of the distributor valve and through the orifice tubes for forcing substantially equal increments of fuel from the ends of the orifice tubes. In connection with the discharge of such increments of fuel, it is to be noted that in this embodiment the above mentioned end fittings 104–118 at the ends of the orifice tubes are not discharge or spray nozzles and do not provide any material restriction to the fuel flow in addition to the restriction of the orifice tubes and, in fact, are optionally provided for the purpose to be described below. In other words, the orifice tubes provide the final control of the distribution of the fuel. As previously indicated, it has been found that commercially available tubing formed from copper or other suitable materials may be used for the orifice tubes so as to promote economical production of the system. This, of course, is in direct contrast to heretofore proposed systems of the fuel injection type which contemplate the use of very expensive precision made and attempted matched sets of discharge atomizing nozzles or planar orifices.

The fittings 104–118 are of the structure shown best in FIGS. 7 and 8, each including an elongated body member having a bore 162 therein for receiving an end portion of an associated orifice tube. A reduced diameter bore 164 extends from an inner end of the bore 162 in axial alignment with the orifice tube and to a discharge opening 166 at the innermost end of the fitting. It is to be noted that the diameter of the bore 164 is at least as great as the internal diameter of the orifice tube so that, as previously stated, the fitting does not materially restrict the fuel flowing from the orifice tube and is so constituted that it in no way serves to break up or atomize the increments of fuel discharged from the end of the orifice tube. In order to provide a vacuum breaking function, each fitting is provided with a transverse passageway 168 intersecting the bore 164 between the orifice tube and the outlet opening 166. The passageway 168 is connected with the atmosphere by suitable passageway 170 (see FIG. 7). This structure serves to relieve any vacuum which might otherwise be applied to the ends of the orifice tubes, so as to prevent fuel in the tubes from being subjected to vacuum effects. While this vacuum relieving or breaking structure provides beneficial results in many situations and facilitates starting of the engine, it has been found that satisfactory results may be obtained when the vacuum breaker structure is omitted.

In order to provide an emergency fuel supply, the auxiliary fuel inlet port 136 of the distributor valve 84 is connected by a conduit 172 with the fuel line 56 in a manner which by-passes the metering pump 52 and the auxiliary inlet of the identical distributor valve 86 is similarly connected with the fuel line 56 by a by-pass conduit 174, as shown in FIGS. 1 and 2. During normal operation of the engine and the metering pump 52, the relatively high fluid pressure provided by the metering pump and the pressure provided by the compression spring 148 easily maintain the check valve 146 in a closed position against the fuel pressure provided by the transfer pump 54 and, of course, the corresponding check valve in the distributor valve assembly 86 is normally maintained in a closed position. However, in the event of a failure of the metering pump 52, the structure is such that the engine may be operated on an emergency basis by fuel supplied directly to the distributor valves 84 and 86 from the relatively low pressure transfer pump 54. While such emergency operation of the engine may be relatively inefficient in the manner fuel is delivered to the engine and in the manner in which the fuel is divided between the cylinders, such inefficient operation will, nevertheless, be far preferable in most instances to a complete engine failure. For example, the emergency procedure for delivering fuel to the engine could be utilized to enable a motorist to drive his vehicle to a garage or a suitable location in which repairs to the metering pump could be effected.

In order to accomplish the emergency delivery of fuel to the engine, the apparatus is provided with means for manually shifting the check valve 146 of the valve member 84 and the corresponding check valve of the valve assembly 86 to open positions. More specifically, the valve assembly 84 is, as shown in FIG. 3, provided with a stem 176 slidably disposed in the bore 138 and connected to or integrally formed with the check valve 146. A cap or push button element 178 is fixed to the outer end of the stem 176 and projects beyond the end of the body member 128. A compression spring 180 is disposed between the cap or push button element 178 and the body member 128 for resiliently biasing the stem 176 outwardly and thereby aiding the abovementioned spring 148 in normally maintaining the check valve 146 against its associated valve seat. Of course, the valve assembly 86 is provided with identical actuating stem, spring and push button elements. It will be observed that in order to permit entry of the auxiliary or emergency fuel supply to the central chambers of the distributor valve assemblies 84 and 86, it is merely necessary to press the push button elements of these valve assemblies axially inwardly so as to unseat the auxiliary fuel supply check valves. This may be accomplished as shown in FIGS. 1 and 3 by providing suitable pivoted levers 182 respectively having ends engageable with the push button elements of the valve assemblies 84 and 86 and having opposite ends connected by separate push-pull cables 184 to a common handle 186 located at the automobile's dashboard. The arrangement is such that the driver may easily actuate the push button elements by pulling out on the handle 186.

Referring now specifically to FIGS. 4, 5 and 6, it is seen that the metering pump 52 comprises a main body member 188 which is formed so as to provide a hydraulic fluid reservoir 190 in an upper end portion thereof. A central bore 192 is formed in the body member 188 and extends from the reservoir or chamber 190 and a pair of additional bores or barrels 194 and 196 extend from the chamber or reservoir 190 at diametrically opposite sides of the central bore 192. All of these bores have accurately finished surfaces and parallel axes. Lower ends of the bores are closed and sealed by a member 198 preferably having projections 200 and 202 extending into the lower end portions of the bores or barrels 194 and 196 so as to reduce the volume thereof.

Pistons 204 and 206 are respectively snugly and slidably disposed in the pumping barrels or bores 194 and 196. Upper end portions of these pistons extend into the chamber or reservoir 190 and are provided with annular radially extending abutment elements 208 and 210 fixed thereto against relative axial displacement. The pistons are biased upwardly by compression springs 212 and 214, respectively disposed between a bottom surface of the reservoir or chamber 190 and the abutment elements 208 and 210.

In order to drive the pistons 204 and 206 downwardly for pumping fluid in the manner described more in detail below, an inclined plate or cam member 216 is provided on a centrally located rotatable shaft 218. Ball bearing elements 220 and 221 are respectively disposed between the inclined plate or cam member 216 and semi-spherical seats in upper ends of the pistons 204 and 206 for preventing sliding frictional contact between the cam member and the upper ends of the pistons. It will be apparent that upon rotation of the shaft 218 and thus the cam member 216, the lower portion of the cam member will pass progressively and successively to and from the pistons 204 and 206 so that the pistons are successively moved downwardly through a predetermined stroke of fixed length by the cam member and then returned to fully raised positions by the springs 212 and 214.

The shaft 218 is rotatably supported and fixed against axial displacement by suitable combined radial and thrust bearing units 222 and 224 and sealed by rotary seal 225, mounted in a body member 226, suitably secured to the upper end of the main body member 188 and closing the upper end of the reservoir or compartment 190. The shaft 218 is adapted to be driven in predetermined speed relationship with respect to the speed of the engine 78. More specifically, as shown in FIGS. 1 and 4, a suitable toothed pulley 228 is fixed to the end of the shaft 218. A toothed endless belt 236 encircles the pulley 228 and the endless belt 236 also encircles and is driven by a toothed pulley 238 on the engine shaft 239.

The body member 188 is provided with ports 240 and 242 respectively extending between opposite sides of the central bore 192, and the pumping barrels or bores 194 and 196 at locations slightly above the end surfaces of the filler projections 200 and 202. Additional ports 244 and 246 extend from the pumping barrels or bores 194 and 196 at locations oppositely from the ports 240 and 242. The ports 244 and 246 respectively communicate with bores 248 and 250 formed in additional body members 252 and 254 suitably secured against opposite sides of the main body member 188. Outer ends of the bores 248 and 250 are closed by suitable plugs 256 and 258.

The body member 252 is formed with fuel inlet and outlet passageways 260 and 262 respectively which intersect the bore 248 adjacent an outer end thereof. The fuel inlet 260 is connected through a check valve assembly 264 with the branch fuel supply line 58 and the outlet 262 is connected by means of a check valve assembly 266 to the fuel discharge line 70. The body member 254 is formed with identical fuel inlet and outlet passageways 268 and 270 which are respectively connected through check valve assemblies 272 and 274 with the fuel supply line branch 60 and the fuel discharge line 72.

The reservoir 190 and the central bore 192 are filled with a suitable hydraulic oil which flows into and out of the pumping barrels or bores 194 and 196 through the ports 240, 244 and 242, 246 under the control of a rotary valve member 276 which will hereinafter be described in greater detail. In accordance with an important feature of the present invention, hydraulically actuated substantially free floating pistons 278 and 280 are slidably disposed and hydraulically centered in the bores 248 and 250 for pumping the fuel or gasoline and separating the fuel sections of the pump from the hydraulic section of the pump. The pistons 278 and 280 are alternately driven outwardly through a pumping stroke by hydraulic fluid which is alternately pumped outwardly through the passageways 244 and 246 by the pistons 204 and 206. The pistons 278 and 280 are actuated through their return strokes during the return strokes of their associated pistons 204 and 206 by means of compression springs 282 and 284 respectively disposed between opposing ends of the plug 256 and piston 278 and the plug 258 and the piston 280. These springs are adapted to shift the pistons 278 and 280 so as to maintain the oil in the ports 244 and 246 under positive pressure at all times.

It is important to note that the overall construction of the pump unit 52 and particularly the construction of the pistons 278 and 280 is such as to preclude any leakage of the fuel or gasoline past the pistons 278 and 280 and into the hydraulic portion of the pump. In this connection it will be observed that during the pumping stroke of either the piston 278 or 280, the pressure of the hydraulic fluid which is behind and is actuating the piston will be greater than the pressure of the fuel or gasoline being pumped. Thus, if any leakage occurs, it will be leakage of the hydraulic fluid around the piston and into the fuel rather than fuel into the hydraulic fluid. However, such leakage of hydraulic fluid or oil is practically eliminated by providing small annular grooves 288 and 290 around mid-portions of the pistons 278 and 280 for providing an hydraulic seal. More specifically, hydraulic oil in the ports 244 and 246 under driving pressure from the pistons 204 and 206 tends to leak around the lands at the inner ends of the pistons 278 and 280 and collect in the grooves 288 and 290 under a pressure similar to the peak driving pressure provided by the pistons 204 and 206. At the end of a driving stroke, the hydraulic oil in the grooves 288 and 290 remains under a relatively high residual pressure. This residual pressure provides an effective hydraulic seal which prevents leakage past the pistons 278 and 280.

As indicated above, the grooves 288 and 290 are filled with hydraulic oil which is maintained at a relatively high residual fluid presure. This pressure acting equally in all directions causes the pistons 278 and 280 to be hydraulically centered in the bores 248 and 250. By maintaining the pistons 278 and 280 centered with respect to the axes of the bores 248 and 250, the mean diametrical clearance between the pistons and the walls of the bores 248 and 250 is maintained at a minimum value, thus further aiding in preventing leakage.

During the return strokes of the pistons 278 and 280, the fluid pressure in the hydraulic oil at the inner ends of the pistons, as has been stated, is positively maintained and is maintained at a value greater than fuel supply pressure at all times. Thus, there will be no tendency for the fuel to leak past the pistons, at least until the pistons reach the innermost ends of their return stroke. However, such leakage is then positively precluded by forming the inner ends of the pistons 278 and 280 with conical valve surfaces 292 and 294 respectively which are adapted sealingly to engage complementary valve seats 296 and 298 formed on the body member 188 around the passageways 244 and 246 respectively.

As shown in FIGS. 4 and 5, the rotary valve member 276 comprises an elongated body rotatably and axially shiftably disposed within the bore 192 and traversing the ports 240 and 242. A relatively large diameter passageway 300 extends downwardly from the upper end of the valve member 276 and communicates with the fluid or hydraulic reservoir 190 and also with a smaller passageway 302 which extends to the lower end of the valve member. The valve member is rotatably disposed on and supported for vertical adjustment by a rod 304 which extends upwardly through a sealed aperture 306 in the member 198, and through the passageway 302. Suitable bearing washers 308 and 310 are fixed against axial displacement on the rod 304 for respectively engaging the lower end of the valve member and the lower end of the passageway 300 for securing the valve member against axial displacement relative to the rod 304 while permitting rotation of the valve member. It is to be noted that the diameter of the rod 304 is substantially less than the diameter of the passageway 302, so that hydraulic fluid may flow through the pasageway 302 to and from the lower portion of the bore 192 beneath the valve member.

The rotary valve member 276 is driven in predetermined relationship with respect to the pistons 204 and 206 and the speed of the engine 78. This is accomplished by providing the shaft 218 with a reduced diameter extension 312 which projects downwardly and into the passageway 300 in the upper end portion of the valve member. A driving connection is provided between the shaft extension 312 and the valve member by means of a crosspin 314 secured to the lower end of the shaft extension and projecting into an elongated slot 316 formed in the side of the valve member. The diameter of the shaft extension 312 is substantially less than the diameter of the passageway 300 to eliminate side thrust on the valve member 276 and so that the hydraulic fluid may flow therethrough between the reservoir and the passageway 302.

The rotary valve member is provided with an annular groove 320 which communicates with the internal passageway 302 through one or more apertures 322. One annular side wall 324 of the groove 320 is formed so that it is inclined to the axis of the valve member as shown best in FIG. 4. The valve member is adapted to be axially adjusted in the manner hereinafter described in detail for locating the inclined edge or surface 324 for traversing the ports 240 and 242. It will be observed that the length of the stroke of the pistons 204 and 206 is constant. The output per cycle of the pump structure is a function of the shape and position of the control edge 324 which is adapted to control the opening and closing of the ports 240 and 242 and thereby the portions of the strokes of the pistons 204 and 206 during which pumping is accomplished. The output per cycle may be varied by adjusting the axial position of the valve member. For example, it is possible to shape and position the surface 324 so that the ports 240 and 242 are respectively closed when their associated pistons begin their down or pumping stroke and are subsequently opened when their respective associated pistons reach the lowermost limit of their down or pumping strokes so that maximum output is obtained. In fact, the arrangement can be such that the ports may be closed before, at, or after top dead center of the pistons, and the ports may be opened before, at, or after bottom dead center of the pistons, or any combination thereof whereby to control the duration or magnitude and the sharpness of the attack and decay of the pressure pulse. Preferably the structure is such that the ports are closed at a desired point during the pumping strokes of the pistons and are not opened again until the pistons reach approximately the same points during their return strokes, so that the oil is always maintained under positive pressure from the time the free pistons 278 and 280 leave their respective seats 296 and 298 until their return to the seats.

It is to be noted that a desirable feature of the rotary control valve is that the adjustments in volumetric displacement of the hydraulic section of the pump are effected by adjusting the time of opening and closing of the ports in relation to the path of movement of the pistons, but such adjustment does not require that the pistons be at a particular point in their paths of travel at opening or cutoff. In other words, the throttle control surface 324 is completely independent of particular positions of the pistons so that the output per cycle of the pump unit 52 is independent of the cyclic speed of the pump. This is so because such variations in volume as occur due to speed variations in the pump may be readily compensated for in the valved section of the pump, so as to provide an overall pumping characteristic curve of desired shape. There is thus provided a true speed density control system.

In order to adjust the rotary valve 276 vertically and thereby vary the output of the pump unit 52 in accordance with the demands of the engine, the lower end of the rod 304 is connected with a lever 326 pivotally supported on an adjustable pin 328 (FIG. 6). The rod 304 is connected with one end of the lever by means of a crosspin 330 extending and riding through elongated slot means 332 in the lever. An opposite end of the lever 326 is similarly connected with a rod 334 having a crosspin 335 secure thereto and projecting and riding into elongated slot means 337 in the lever. The rod 334 is provided with a threaded end portion which is adjustably turned into an internally threaded sleeve 336 which is joined to or integrally formed with a stem 338.

As shown in FIG. 4, the hollow sleeve and stem extend through chamber means provided by a pair of complementary members 340 and 342 suitably secured together and to an end member 344 of housing means including a side wall structure 346 fixed to the lower end of the pump body 188. An annular flexible diaphragm 348 is clamped between the members 340 and 342 and the member 342 is elongated so as to provide a chamber 350 sealed at one end by the diaphragm and substantially sealed at the other end by a suitable fitting 352 secured to the member 342 and snugly and slidably accommodating the stem 338. The chamber 350 is connected by means of a tube 354 with the air manifold of the engine 78 while the chamber at the opposite side of the diaphragm 348 is vented to the atmosphere. Thus, the diaphragm 348 wil be positioned in accordance with the vacuum condition in the engine manifold or, in other words, in accordance with the flow of air into the engine. Calibrated compression springs 356 and 358 are disposed for progressively resisting deflection of the diaphragm 348 in response to varying manifold pressures less than atmospheric pressures in a manner to be described more fully hereinbelow. A spring 372 is compressed betwen a cup-shaped portion of the end fitting 352 and a washer or annular abutment 374 fixed on an outer end portion of the stem for progressively resisting deflection of the diaphragm in response to varying manifold pressures in excess of atmospheric pressure.

The flexible diaphragm is connected with the sleeve and stem 336–338 in a manner which causes the sleeve and stem to move axially in accordance with axial movements or deflection of the diaphragm. Thus, the axial movement or deflections of the diaphragm will be transmitted to the lever 326 and the rod 304 for axially adjusting the rotary valve 276. At the same time the connection between the diaphragm and the sleeve and stem is such as to permit the sleeve and stem to be rotated relative to the diaphragm and to the threaded rod 334 for axially adjusting the rod 334 with respect to the diaphragm. Such adjustment enables the initial position of the rotary valve 276 to be adjusted for purposes hereinafter set forth. The connection between the diaphragm and the sleeve comprises axially fixed annular washers 360 and 362 on the sleeve and rod in position to engage opposite ends of a hollow threaded bolt-like member 364 which extends through the annular diaphragm and serves in cooperation with a nut member 366 in clamping a pair of sheet metal discs 368 and 370 against opposite sides of the flexible diaphragm.

As may be determined chemically and otherwise, maximum power of an internal combustion engine may be obtained from a given amount of fuel when one air to fuel ratio is used while maximum efficiency is usually obtained when a larger air to fuel ratio is used. For example, with a fuel such as gasoline maximum theoretical power is usually obtained with an air to fuel weight ratio of about 12.5 to 1, while maximum theoretical efficiency is obtained with an air to fuel weight ratio of about 15.4 to 1. However, each internal combustion engine or family of engines has individual performance characteristics and air-fuel ratio requirements. By way of example, FIG. 19 shows a typical pounds of fuel per brake horsepower per hour curve for a gasoline engine, which curve is obtained by holding the speed and manifold pressure or vacuum, and thus the air intake of the engine, constant and plotting the horsepower output obtained as the amount of fuel is decreased from the right hand end of the curved line toward the left hand end of the curved line. The point 376 on this curve indicates the amount of fuel or the air to fuel ratio required for obtaining maximum efficiency when the engine is operating at the speed at which the curve is developed, and the point 378 indicates the amount of fuel or the air to fuel ratio required to obtain maximum power at the specified engine speed.

As will be understood curves of the type shown in FIG. 19 will vary for each engine speed and manifold pressure or vacuum. A triaxial diagram showing a plurality of such curves for a particular engine taken at various engine speeds is shown in FIG. 20 with the curve for a relatively high or maximum engine speed being at the right of the diagram and the curve for a relatively low or idle engine speed being at the left. A broken line 380 connecting the points of maximum efficiency on the curve outlines the air to fuel ratios which should be used throughout the range of engine speeds for obtaining maximum efficiency and similarly the broken line 382 connecting points of maximum power outlines the air to fuel ratios which should be used throughout the range of engine speeds for obtaining maximum power.

The present invention contemplates that the fuel delivery rate of the pump unit 52 can be correlated with the air intake of the engine over the full range of engine speeds so as to obtain a desired air to fuel ratio throughout the range of engine speeds and loads likely to be encountered during normal operation of the engine. For example, in the event the engine is to be used in an installation in which fuel economy is the controlling consideration, the fuel metering pump 52 should be adapted to deliver fuel so that the air to fuel ratio would follow a maximum efficiency curve of the type illustrated by the line 380 in FIG. 20. On the other hand, if the engine is to be used for racing purposes or the like where power is the primary consideration, the metering pump unit 52 should be adapted for delivering fuel at a rate so that the air to fuel ratio follows a maximum power curve of the type illustrated by the broken line 382 in FIG. 20.

It is recognized that in many installations such as in standard automobiles or trucks, it is usually desirable to operate the engine at maximum efficiency over a range of conditions and speeds while at the same time it is desirable to obtain maximum power under other conditions. Line 384 in FIG. 20 represents the various air to fuel ratios to be provided in such an installation. It will be observed that for intermediate engine speeds the curve 384 corresponds with the maximum efficiency curve 380 while at the higher speeds the curve 384 shifts from the maximum efficiency curve 380 to the maximum power curve 382, since at such high speeds the operator of an automobile, truck or the like, is usually more concerned with obtaining power than economy. Furthermore the richer mixture provides a cooling effect which tends to prevent overheating of the engine at high speeds.

As shown in FIG. 20 the curve 384 also shifts from the maximum efficiency curve to the maximum power curve at the extreme slow or idle speed of the engine since at such slow speeds the intake of new air into the engine intake manifold and cylinders during each complete cycle of operation is relatively small in proportion to the volume of exhaust gases remaining in the cylinder so that a richer mixture is desirable in order to enable the engine to idle properly. The present invention contemplates that the metering pump 52 may be modified so as to correlate the delivery thereof with the air intake of the engine in a manner which will cause the air to fuel ratio to follow a selected one of the curves 380, 382, 384 or a desired variation thereof. In other words, depending upon the use to which the engine is to be put, there is an optimum operational air to fuel curve which may correspond to the curve 380, 382 or 384 shown in FIG. 20, or modifications thereof, and the present invention contemplates that the fuel metering pump 52 will deliver fuel at a rate which is correlated to the air intake of the engine so that the air to fuel ratio will follow the optimum operational curve for the particular installation requirements and performance.

FIG. 21 represents an air volumetric efficiency diagram for a typical internal combustion engine in which the curve 386 represents the air intake of the engine per cycle of operation at various speeds and at wide open throttle (WOT) and zero manifold vacuum, while the curves 387, 388, 389, 390 and 391 represent the air intake per cycle at various speeds and at different fixed partially closed throttle conditions. It will be observed that at wide open throttle the air intake per cycle will be determined in accordance with limitations imposed by the overall construction of the engine including the air manifold, valves and the like. On the other hand, once the usual throttle valve of the engine has been closed sufficiently so as to accomplish a substantial throttling effect, the air intake into the engine is under the control of the throttle valve. Curves 392, 393, 394, 395, 396 and 397 in FIG. 21 indicate air intake per cycle at constant manifold pressures for given ambient conditions and under throttle control. It will be observed that curves 392-397 may vary slightly but are substantially flat.

Figure 22:
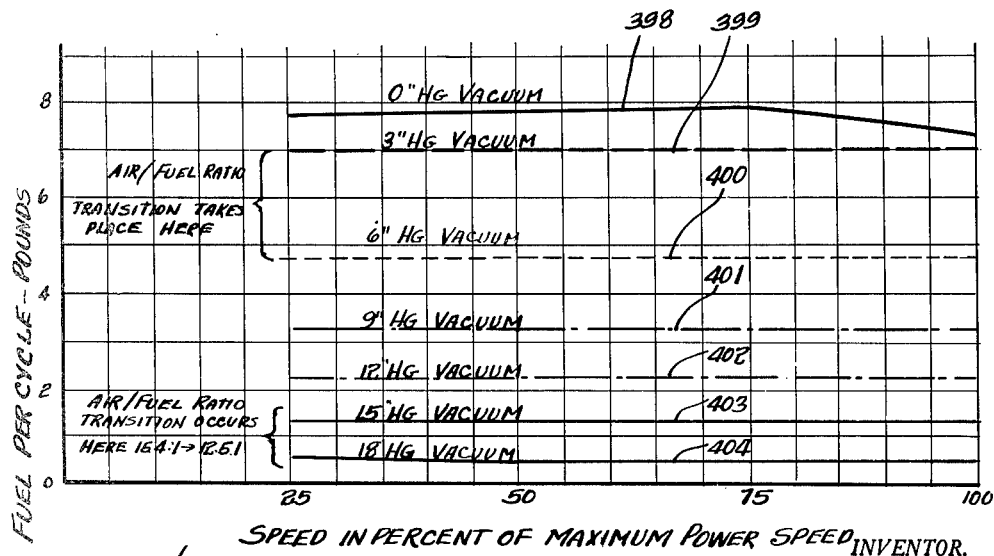
FIG. 22 is a diagram showing the rate of fuel delivered to the engine at various engine speeds and conditions of manifold vacuum in accordance with the present invention.

FIG. 22 shows output curves of the pump unit 52 constructed in accordance with the present invention for various manifold conditions of the engine referred to above. The uppermost curve 398 represents the output or volumetric efficiency of the pump unit 52 at zero manifold vacuum. It will be observed that the pump unit is constructed so that the curve 398 corresponds substantially to the volumetric efficiency curve 386 of the engine at wide open throttle so that, regardless of the speed of the engine under wide open throttle conditions, the desired substantially constant (for example the maximum power ratio) air to fuel ratio will be maintained. It will be noted that succeeding curves 398, 399, 400, 401, 402, 403 and 404 representing fuel output of the pump unit per cycle at various pump speeds and at different engine manifold vacuums (obtained with a partially closed throttle) are, with slight variations, generally flat straight lines and respectively correspond substantially to the curves 391-397 in FIG. 21 of air intake at the corresponding manifold pressures. Thus, the metering pump unit is matched with the engine and is adapted to maintain the desired air to fuel ratios over substantially the entire range of engine speeds and manifold pressures. It will further be noted by reference to FIGS. 21 and 22, that in the initial increments of manifold vacuum from zero to about five inches, the delivery of fuel is decreased to a relatively greater extent so as, in the illustrated embodiment, to shift the air to fuel ratio from maximum power to maximum efficiency as discussed above in connection with curve 384 in FIG. 20.

Figure 23:
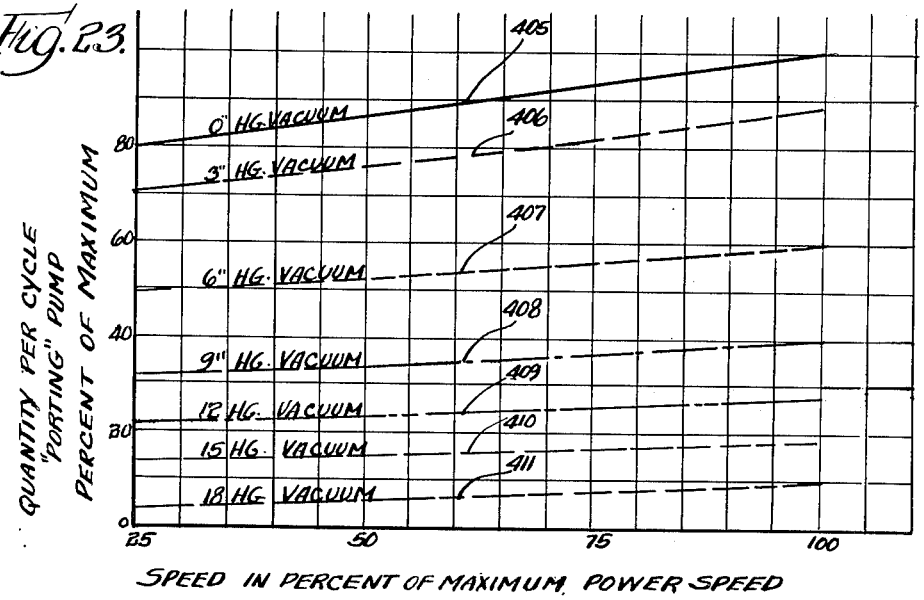
FIG. 23 is a volumetric efficiency diagram for the porting pump section of the fuel supply system of the present invention.
Figure 24:
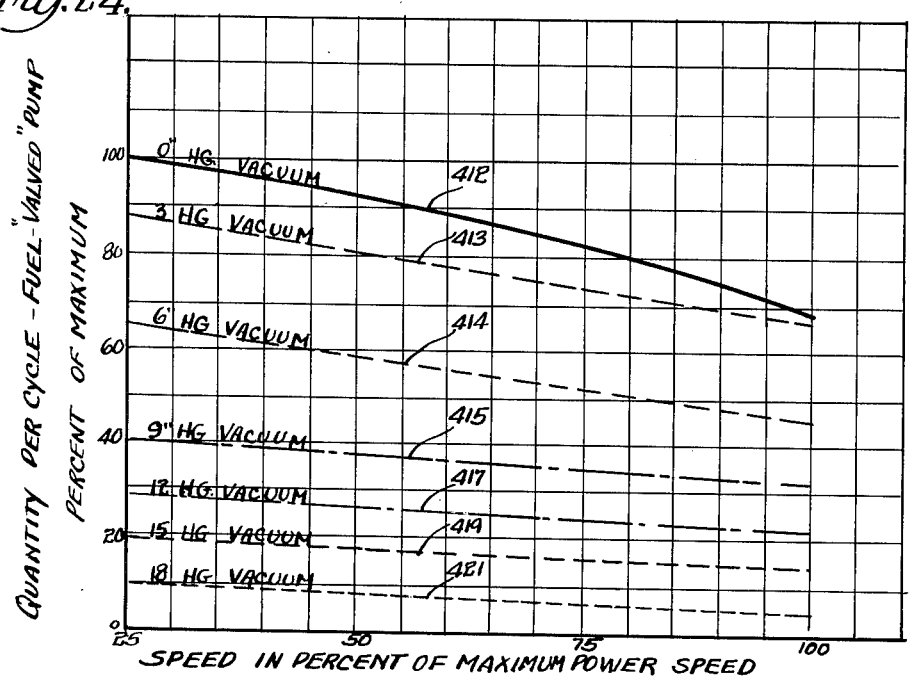
FIG. 24 is a volumetric efficiency diagram for the valved pump section of the fuel supply system of the present invention.

In order to provide the metering pump unit 52 with the output characteristics illustrated in FIG. 22, it is to be noted that the unit, in effect, includes a first "porting" pump section (the hydraulic section in which flow is controlled by element 276 moving past a port) and a second "valved" section (the fuel or gasoline section in which flow is under the influence of valve elements movable axially against valve seats). FIG. 23 shows the volumetric efficiency curves 405, 406, 407, 408, 409, 410 and 411 for the hydraulic or porting pump section for the manifold conditions of the curves 398–404 in FIG. 22, and FIG. 24 shows volumetric efficiency or output curves 412, 413, 414, 415, 417, 419 and 421 of the gasoline or valved pump section. It will be noted that the curves of FIG. 23 rise with increases in speed and the curves of FIG. 24 fall with increases in speed.

The inclination and shape of the curves shown in FIG. 23 may be determined by the shape of the control surface or edge 324 of the rotary valve 276. In other words, the annular surface or edge 324 is specifically formed so that the output curves of the hydraulic section shown in FIG. 23 are correlated with the output curves of the fuel or gasoline section shown in FIG. 24 for providing the overall pump output curves of FIG. 22. The location of the curves of FIG. 23 may be adjusted or changed by adjusting the effective length of the controller rod 334 and by specifically determining the spring rates of the controller springs 356, 358 and 372. In this connection, it is noted that in the embodiment shown, the spring 356 is a relatively heavy spring and the spring 358 is relatively light. Furthermore, the springs are arranged so that substantially only the light spring offers resistance to downward movement of the diaphragm at zero and relatively small manifold vacuums or in other words, when the engine throttle is wide open or substantially open. This enables the controller diaphragm and thus the rotary control valve 276 to shift relatively rapidly from a maximum fuel delivery position when the engine throttle is wide open and the operator is seeking to obtain maximum power to a position at which maximum efficiency may be obtained. The relatively heavy spring 356 then assumes primary control of further deflection of the diaphragm so that the diaphragm will move for adjusting the control valve 276 to maintain maximum efficiency air to fuel ratios when the engine is operating with a partially closed throttle and the operator is no longer seeking maximum power.

The slope and shape of the curves shown in FIG. 24 may be modified and correlated with the curves of FIG. 23 to provide the desired results by modifying or adjusting the valve assemblies 264, 266, 272 and 274. As shown in FIG. 4 the valve assemblies 264 and 266 respectively include axially shiftable check valve elements 416 and 418 which are normally biased toward closed positions by springs 420 and 422. The slippage of the fuel pumping section and thus the output efficiency curves thereof may be adjusted by changing the shape of the check valve elements and/or by adjusting or changing the spring rates of the springs 420 and 422. Of course the check valve assemblies 272 and 274 are identical to the assemblies 264 and 266 and may be modified or adjusted in the same manner.

While the structure of the metering pump 52 thus far described is capable of maintaining the desired air to fuel ratio under constant atmospheric conditions, it is apparent that the engine may be subjected to numerous environmental changes which tend to change the density of the air drawn into the engine and therefore, the ratio of the weight of air to the weight of fuel taken into the engine per cycle. The most important of environmental conditions subject to change is temperature and the metering pump unit is provided with means for correcting the output thereof for changes in temperature so as to maintain the desired air to fuel ratio. This means is shown in FIGS. 4 and 6 (see also FIG. 11). More specifically, the pivot pin 328 which supports the lever 326, is fixed to a slidable plate member 424 having slots 426 and 428 therein which are inclined with respect to the longitudinal axis of the lever. The plate member 424 is slidably supported by a pair of pins 430 and 432 which extend through the elongated slots 426 and 428 and are fastened to housing wall 346. The plate member 424 is adapted to be shifted back and forth in accordance with changes in temperature and this is accomplished by means of a flexible bellows 434 having one end anchored to the housing wall 346 and an opposite end thereof connected with the plate member by a rod 436. A bulb 438 is disposed to sense the temperature of the air drawn into the engine which bulb is connected with the interior of the bellows by a tube 440. The bellows and the bulb are filled with a suitable temperature responsive fluid so that upon expansion and constraction of the fluid in response to temperature changes the bellows will flex to adjust the plate member 424.

It is to be noted that as the plate member 424 is adjusted back and forth diagonally with respect to the longitudinal axis of the lever 326 and also diagonally with respect to the parallel axes of the rods 304 and 334, the axis of the pivot pin 328 will also be shifted diagonally. As the result of the component of movement of the pivot pin parallel to the axes of the rods 304 and 334 the rotary valves 276 will be axially adjusted to vary the overall output of the metering pump to compensate for temperature changes which occur at a given position of the controller diaphragm 348 which, of course, is determined by a given engine manifold pressure or vacuum. At the same time it is important to note that the component of the movement of the pivot pin 328 which extends transversely between or perpendicularly to the parallel axes of the rods 304 and 334 causes a change in the effective lever arms between the pivot pin 328 and the pin 330 on the rod 304 and between the pivot pin 328 and the pin 335 on the rod 334. Thus, for every different temperature condition there is a different ratio between the effective lengths of these lever arms so that a given amount of movement of the controller diaphragm 348 will cause different amounts of axial adjustment of the rotary valve 276 at different temperatures. The construction is such that the same percentage of compensation in fuel delivery is obtained for each given temperature over the full range of fuel consumption by the engine. For example, reference is made to FIG. 25 in which line 442 represents the amount of fuel to be delivered to the engine as the throttle is opened from an idle position to a wide open position. Line 444 represents the amount of fuel to be delivered to the engine when the temperature changes from that at which line 442 was developed to correspond to the air density changes by a certain percentage. It will be observed that the percent of correction represented by the line 444 is substantially constant throughout the range of fuel delivery or consumption.

Another factor which affects the density of the air consumed by the engine is barometric pressure. A suitable percentage compensation may be provided for changes in barometric pressure by connecting a pressure sensitive bellows 446 in tandem with the bellows 434, as shown in FIGS. 4 and 6. However, for many installations the changes in barometric pressure and air density occasioned thereby will be so small that they may be ignored. For such installations the pressure sensitive bellows 446 may be omitted. However, the structure with or without the bellows 446 is such that an initial adjustment may be made for the usual average barometric pressure at the particular location at which the engine is to be operated. For example, an engine which is intended to be operated high in the mountains would normally be subjected to a barometric pressure substantially less than the pressure encountered by an engine which is to be operated in the low plains or along the seashore. The initial adjustment previously mentioned may readily be accomplished by changing the effective length of the rod 436. For example, the rod 436 may be provided with a threaded end portion turned into a suitable aperture formed in the plate member 424 and the rod 436 may be adjusted in length by turning it to a greater or lesser extent into this plate member 424. This same adjustment also provides ready means for matching the pump unit 52 to a particular engine whereby to compensate for minor variations in a family of pumps and/or a family of engines.

The method of supplying fuel to the engine 78 while utilizing the apparatus thus far described is, in accordance with the present invention, accomplished in the following manner. The pump unit 52 is constructed and adjusted in the manner herein described above, so that its output or discharge characteristics are matched with the particular requirement of the engine and the installation. More specifically the pump unit is constructed, adjusted and driven in predetermined speed relationship with the speed of the engine so that accurately metered quantities of fuel are delivered in amounts associated with the air intake of the engine over substantially the full range of operating speeds and conditions of the engine so that the weight of air to weight of fuel ratios will follow a preselected ideal or optimum operational curve of a desired type such for example as the types illustrated by the curves shown in FIG. 20. Furthermore, it is important to note that in the described embodiment the fuel is supplied by a series of high impact intermittent high pressure jet pulses. In this embodiment the pulsating discharge of the pump unit 52 is initially divided into two streams which are carried by the discharge lines 70 and 72 to the distributor assemblies 80 and 82. Then the pulsating streams are substantially uniformly divided by jet pulse action within the distributor means 80 and 82 in the manner described above and directed to the various engine cylinders.

The fuel is ejected from the ends of the orifice tubes of the distributor assemblies 80 and 82 in pulse increments and into the air manifold of the engine in the immediate vicinity of the air intake valve pockets of the various cylinders. As indicated previously herein the construction is such that the fuel is not sprayed or atomized as it is ejected from the orifice tubes and the vacuum breakers or end fittings at the ends of the tubes. Furthermore, for certain installations it may be unnecessary and no attempt is made to time the discharge of the separate increments or pulses of fuel with respect to the time of opening and closing of the air intake valves other than that the pump is driven by the engine so as to provide a measured amount of fuel into the air manifold for each cylinder for each complete cycle of operation thereof. However, in an embodiment described below the pulses of fuel from each orifice tube are timed so that they are discharged while the piston inlet ports respectively associated with the tubes are open. Thus, the accurately measured increments or droplets of fuel are deposited in desired aggregate on surfaces of the engine in the vicinity of the air inlet valve pockets. Upon opening of the inlet valves the fresh air rushing into the cylinders sweeps the fuel from such surfaces and carries the fuel into the cylinders. With this procedure of delivering fuel into the cylinders, the fuel is mixed primarily only with the fresh air entering the cylinders and evaporation of the fuel and mixing of the fuel thoroughly throughout the fresh air takes place primarily within the cylinders. As a result, the engine tends to run cooler per horsepower so that lower octane fuel may be used and the cooling effect of the evaporating fuel tends to reduce the necessary work required for compressing the fuel and air mixture within the cylinders so that the net output of the engine is increased. The air and fuel mixture, being cooler, is of greater density and capable of producing more power. This procedure for supplying fuel to the cylinders further promotes an increase in power output for a given amount of fuel since any tendency for a portion of the fuel to be mixed with waste gases remaining in the cylinders as occurs with many of the previously suggested fuel injection systems is minimized, and preoxidation of the fuel which occurs when the fuel is evaporated and mixed with air in the presence of heat in presently available carburetors is also minimized. Thus, it is seen that the present method and apparatus is capable of not only accurately delivering the right amount of fuel and evenly distributing the fuel to the various cylinders for accurately maintaining the desired air to fuel ratio over substantially the entire range of operating conditions and speeds of the engine, but the present method and apparatus are also capable of obtaining improved performance from the fuel after the fuel is delivered to the cylinders. By way of example only, it is noted that tests have been performed with an engine in which fuel was supplied by means of a standard carburetor and then by the apparatus and in accordance with the method described hereinabove and such tests showed the engine capable of delivering about 135 H.P. when operated with the standard carburetor and in excess of 220 H.P. when the method and apparatus of the present invention were utilized. Further, the utilization of the apparatus and methods of the present invention permits the use of engine modification and auxiliaries such for example as forced air induction, higher compression components, valve timing, and tuned sonic air intake. With the utilization of these factors, the abovementioned engine will be capable of delivering in excess of 325 H.P.

In FIGS. 9–18 a modified embodiment of the present invention is shown. In these figures elements of the structure corresponding to the elements of the embodiment described above are indicated by identical reference numerals with the suffix *a* added. In general, one important difference of this embodiment from the structure described above is that the metering pump unit 52a is a single barrel rather than a two-barrel pump and as a result, the system 50a includes only a single discharge line 70a extending from the pump to a single distributing means 80a. The distributing means 80a is identical to the above described distributing means 80 with the exception that, as shown in FIG. 9, it includes six rather than four orifice tubes. It is contemplated that the system 50a shown in FIG. 9 with the single barrel metering pump may be used in connection with smaller engines than the eight cylinder engine shown in connection with the system described above, since the single barrel pump 52a may not be capable of providing the same maximum fuel output as the two-barrel pump described above.

While the system 50a shown in FIG. 9 is particularly adapted to be used in association with six cylinder engines, it is to be understood that the system may readily be adapted for use with engines having a smaller number of cylinders and even for use with certain engines having a greater number of cylinders. In this connection, it is also to be understood that the system shown in FIGS. 1 and 2 and described above may similarly readily be modified for use with engines having different numbers of cylinders and engines of different sizes.

As previously indicated, except for the metering pump 52a, the construction and operation of the system 50a is essentially identical to the system 50. As shown best in FIGS. 10, 14–16 and 18 the body member 188a of the pump 52a is provided with a single pumping barrel or bore 194a, which bore is defined by an insert 447 fixed within the body member. A piston 204a is reciprocably disposed in the bore 194a, which piston is provided with a central passageway 448 which extends from the lower end thereof toward but short of the upper end thereof. A transverse aperture 450 is provided in the piston for establishing communication between the upper end of the passageway 448 and the hydraulic fluid reservoir 190a. In order to actuate the piston 204a a rocker arm 452 is pivotally supported within an upper end portion of the pump body by a pin 454, which rocker arm is provided with elongated slots 456 and 458 in opposite end portions thereof. The upper end of the piston 204a is connected with one end of the rocker arm by means of a pin 460 extending through the slot 456. The opposite end of the rocker arm is connected with and driven by an eccentric pin 462 carried by the drive shaft 218a which in turn is adapted to be driven from the engine.

The pumping action is obtained by trapping hydraulic fluid within the bore 194a and the hollow piston 204a during downward movement of the piston 204a so that the free but spring biased piston 278a in the fuel or gasoline section of the pump is hydraulically actuated downwardly for forcing fuel from the bore 248a and out through the passageway 262a and the discharge check valve assembly 266a shown in FIG. 18. The piston 204a is mechanically driven through a stroke of fixed length and in order to vary the effective length of the pumping stroke, a sleeve-like valve member 464 (see FIGS. 14 and 16) is positioned around the piston 204a for covering and uncovering the port 450. The sleeve 464 is adapted to be adjusted vertically or axially of the piston so that the point at which the port 450 will be closed may be varied for changing the effective length of the pumping stroke and therefore, the output of the pump.

The sleeve valve member 464 is adapted to be vertically adjusted for controlling the output of the pump unit 52a so as to maintain the desired air to fuel ratios in substantially the same manner as the rotary valve 276 discussed above. More specifically, by referring particularly to FIGS. 10, 11 and 16 it is seen that the pump unit 52a includes control and percentage compensator means for adjusting the position of the sleeve valve 464 which means are essentially identical to the corresponding means described above for adjusting the rotary valve 276. Thus, the details of the structure and operation of the control and compensator means for the pump 52a need not be repeated.

FIGS. 26, 27 and 28 show another modified form of the present invention which is similar to the structures described above as indicated by the application of identical reference numerals with the suffix b added to corresponding elements. This embodiment differs from those described above primarily in that the metering pump unit 52b has a number of fuel pumping pistons and fuel inlets and outlets corresponding to the number of cylinders in the engine with which the system is to be associated so that the orifice tubes 88b through 102b are connected directly with the outlets of the pump structure. This system further enhances the accuracy with which fuel may be uniformly distributed to the various cylinders of the engine.

Referring particularly to FIG. 27, it will be seen that the pump unit 52b is essentially identical to the metering pump 52, as shown in considerable detail in FIG. 4. However, it is to be noted that in this embodiment the bores 194b and 196b as well as the additional corresponding bores of this unit which are shown in FIG. 28 but need not be numbered, extend radially with respect to the central axis of the pump structure rather than parallel to the pump axis. The outer ends of the radially extending bores 194b and 196b are connected with the ports 244b and 246b by passageways 466 and 468. The remaining radially extending bores are similarly connected by passageways with their associated fuel pumping sections of the structure. It has been found that this arrangement enables the overall size of the pump unit 52b to be minimized even though it includes a substantially larger number of pistons than the previously described pump structure 52. This arrangement also enables the actuating cam member 216b to be in the form of an eccentric arranged directly between the ends of the pistons.

In this embodiment the fuel supply line from the transfer pump is preferably connected with an annular manifold 470 located at one end of the pump body and communicating with the various inlet check valves 272b as shown in FIG. 27. The use of such a manifold eliminates any possibility of a hydraulic ram effect being created at the inlets of the various pumping cylinders.

The tubes 88b through 102b which respectively extend from the various discharge check valves 266b of the pump to the various cylinders of the engine may be equal in size and length as described above. However, since in this embodiment the fuel flowing through each of these tubes is separately metered by the pump 52b, the tubes may in many instances be more conveniently formed in different lengths so as to facilitate connection with the engine at locations adjacent different cylinders which obviously are necessarily located at different distances from the pump. When the tubes are formed of different lengths they will obviously contain different masses or volumes of fuel. Such different masses of fuel result in the creation of different inertial effects in the various tubes when the fuel is subjected to the jet pulses provided by the pump. In order substantially to eliminate such inertial effects and thereby insure that the increments of fuel discharged from all of the tubes will be accurately controlled by the action of the pumping pistons, flow restricting devices 472, 474, 476, 478, 480, 482, 484 and 486 are connected in the tubes 88b through 102b respectively as shown schematically in FIG. 26. Such flow restricting devices may be in the form of planar orifices, check valves and the like of known construction and therefore they need not be described in detail. It suffices to state that the restriction provided by such devices should be sufficient to eliminate the inertial effects referred to above without otherwise limiting or metering the fluid output of the various pumping pistons of the pump 52b.

It is further to be noted that the flow restricting devices 472 through 484 are spaced from the ends of the tubes or fuel passageway means 88b through 102b, and preferably the flow restricting devices are spaced substantially equally from the ends of their associated fuel passageway means. Thus, any inertia effects in the passageway means downstream from the flow restricting devices will be substantially equal in all of the passageway means. Furthermore, with this arrangement, in the event of any atomization or vaporization of the fuel as the fuel passes through the flow restricting devices, the fuel will condense in the portions of the tubes or passageway means downstream from the flow restricting devices so that only substantially liquid fuel will be supplied to the engine and into the various intake valve pockets in the manner and for the purposes described fully hereinabove.

FIGS. 29 through 32 show a further embodiment of the present invention which is similar to the structure described above, particularly the embodiment of FIGS. 26-28 as indicated by the application of identical reference numerals with the suffix c added to corresponding elements. In this embodiment, the metering pump unit 52c is provided with a number of pumping chambers and fuel outlets corresponding to the number of cylinders in the engine 78c. In the embodiment shown the metering pump unit 52 is provided with eight outlets respectively connected to orifice tubes 88c through 102c. One difference in this embodiment is that the orifice tubes are respectively connected with nozzles 500 through 514 which will be described more in detail below.

As indicated above, the metering pump unit 52c is essentially identical to the unit shown best in FIG. 27. However, the unit 52c incorporates modifications which facilitate manufacturing and installation as well as overall efficiency. For example, the bores 194c and 196c in which the pumping pistons 204c and 206c operate are provided by wear resisting inserts 516 and 518 mounted within the main pump body. Outer ends of the bores 194c and 196c are respectively closed and partially filled by plugs 520 and 522 in a manner such that the volume of the bores is reduced whereby to increase the efficiency of the pump.

In this embodiment, the lower end of the pump shaft 218c is fully enclosed within a housing member 524 which supports a bearing unit 526 associated with the lower end of the pump shaft. The housing member 524 also provides bearing means and a support for a drive shaft 528 which carries a worm 530 meshing with the worm gear 228c. An outer end of the shaft 528 carries a gear or toothed sprocket 532. A toothed endless belt 534 shown in FIG. 29 encircles the sprocket or toothed pulley 532 and also a similar sprocket or toothed pulley 534 on a shaft 536 of the engine 78c so that the pump shaft 218 is driven in predetermined time relationship with respect to the rotation of the engine 78c. The arrangement is such that the pump shaft 218c is rotated once for every two rotations of the crank shaft of the engine.

In this embodiment the adjustable mounting for the controller lever 326c has been simplified. More specifically, the pivot shaft 328c for the lever arm 326c is eccentrically mounted on a shaft 538 which in turn is rotatably supported in the wall of the housing member 540. Upon rotation of the shaft 538, the pivot pin 328 will move along an arc having directional components extending both axially and radially of the axis of the pump shaft. In other words, the resulting movement of the pivot pin 328 corresponds to the diagonal movement of the pivot pin upon adjustment of the slide member in the previously described embodiments. Any suitable means, not shown, may be provided for locking the shaft 538 in the desired adjusted position or, if desired, temperature and atmospheric pressure responsive devices may be connected for automatically adjusting the position of the shaft 538 in substantially the same manner as the devices 434, 436, and 446 of the embodiment described above.

All of the nozzles of the embodiment shown in FIGS. 29-32 are identical, and as shown best in FIG. 31, each nozzle comprises a main body member 542 having an end fitting 544 threaded thereon for cooperation with a seal ring 545 in securing an associated orifice tube. A portion of the body member 542 is threaded as at 546 so that the nozzle is adapted to be mounted in a wall 548 of the engine manifold by turning it into an internally threaded aperture 550 formed in the wall as shown in FIG. 30.

The nozzle has a center filler plug member 552 disposed within the body member 542 and supporting a filter 554. The member 552 is provided with a discharge orifice 558 defined by a conical valve seat 560. A valve element 562 is disposed for engaging and sealing the valve seat, which valve element is integral with a pintle 564 having an abutment 566 at its inner end. A fitting 567 is connected with the abutment 566 and with a tension spring 568 which is connected with a hanger 569 surrounding the apertured plug member 552. The spring is constructed so as to maintain the valve element 562 closed until a predetermined pressure has been built up within the nozzle. Each nozzle is associated with one cylinder 572 of the engine, and as shown best in FIG. 30, the nozzles are positioned for dispersing the fuel into the air intake manifold and toward the inlet port 574 of the cylinder.

Actual highway tests have been made with vehicles having fuel systems constructed in accordance with the embodiment of FIGS. 29 through 32, and these tests have shown increases in power, economy and performance which are significantly greater than improvements which might be expected from the fact that chemically correct fuel air ratios are accurately maintained. The accurate measurement and delivery of the fuel to the respective cylinders is, of course, important and the pumping unit 52c as well as the previously described pump units are particularly suitable for this purpose. It will be observed that the pumping unit 52c, as shown in the drawings, does not include specific temperature or pressure compensating devices. However, it has been found that as a result of certain structural features of the pumping unit, it automatically compensates for many of the natural changes in temperature and pressure to which an engine in a vehicle may be subjected. For example, as the ambient temperature increases, the density of the air increases and less oxygen is drawn into the engine for combustion purposes. However, at least partial compensation is obtained since at the same time the efficiency in output of the pump unit will decrease as a result of greater slippage of the parts because of a lowering of the viscosity of the oil between the pistons 204c and 206c and the associated free piston 278c and 280c. Of course, the reverse compensation is obtained when the temperature decreases.

The manner of dispersing the fuel in the air is also important. As indicated in connection with the previously described embodiments a portion of the fuel is delivered into the manifold adjacent the inlet openings of the cylinders in a non-atomized and liquid state whereby to promote cooling of the air with resulting increases in weight of the fuel air charge within the cylinder and decreases in the work required to draw the air into the cylinder and to compress the air and a reduction in the combustion temperature. It has been found that still further improved results are obtained when utilizing the nozzles of this embodiment which are constructed for dispersing the fuel into the air in a manner such that a portion of the fuel is in relatively large liquid droplet form, another portion of the fuel is finally atomized and vaporized and still other portions of the fuel are in a particulate form varying between the relatively large droplets and the substantially monomeric vapor. When the fuel is dispersed from the nozzles into the air immediately adjacent the inlet openings in this manner, a substantial portion of the fuel which is in liquid form and in relatively large droplets functions for promoting cooling and efficiency in the manner which has previously been described herein in detail. Other portions of the fuel substantially in the form of a monomeric vapor are present and are instantly ready for burning whereby to promote instant response which is particularly desirable in motor vehicle engines. The other particles of fuel from the monomeric vapor to the relatively large droplets require slightly varying amounts of time in which to vaporize sufficiently for burning. Thus it has been found that by initially dispersing the fuel with portions thereof in different particle sizes instant response and cooler and more efficient operation can be obtained and at the same time it is believed that the speed of the flame front during burning of a charge may be controlled by the different periods of time required to vaporize different portions of the fuel in a manner for timing and extending the length of the burning for more effectively and efficiently applying the energy derived from the fuel to the engine crank shaft. In other words, it is believed that the aforementioned dispersion of the fuel functions to shift and determine the timing of the firing or flame front propagation in the cylinder so that the "explosion phase" or time is accurately determined by the dynamics of the system rather than merely by the electrical ignition timing and in a manner for maintaining firing pressure during downward movement of the cylinder so that maximum power thrust against the cylinder head occurs when the crank shaft has rotated toward a position for providing a maximum effective lever arm. Thus with the system of the present invention, fuel is not only accurately delivered to each cylinder of an engine in accordance with air intake for providing the desired fuel air ratio, but the fuel is also dispersed within the air in a manner which greatly increases the utilization of the potential energy of the fuel.

While the preferred embodiments of the present invention have been shown and described herein, it is obvious that many changes may be made without departing from the spirit and scope of the appended claims.

The invention is claimed as follow:

1. An apparatus for supplying liquid fuel to an internal combustion engine comprising a metering pump structure for supplying an intermittent flow of high pressure pulses of fuel in accordance with air intake of the engine for obtaining air to fuel ratios generally following a predetermined optimum operational curve of said engine, said pump structure including body means having a first bore therein, a hydraulic fluid reservoir in said body means, a first piston reciprocably disposed within said bore, port means connecting said bore and said reservoir, means engaging said piston for mechanically driving said piston through a pumping stroke of fixed length in timed relationship with engine speed, an adjustable valve member for closing and opening said port means for controlling the effective length of the pumping stroke of the piston and thus determining measured quantities of hydraulic fluid displaced during the effective pumping stroke of the piston, means for adjusting said valve member in accordance with weight of air intake into the engine, said body means having a second bore therein, a hydraulically operable piston axially slidably disposed in said second bore and substantially sealing said second bore and being free from any peripheral connection with said body means, passageway means connecting said first bore with said second bore at one end of said second piston for directing said measured quantities of hydraulic fluid from the first bore into the second bore for actuating said second piston, the length of the pumping stroke of said second mentioned piston being determined by said measured quantities of hydraulic fluid, fuel inlet means and fuel outlet means connected with said second bore at an end of said second piston oppositely disposed from said passageway means, first and second check valve means respectively disposed in said fuel inlet means and said fuel outlet means, and elongated orifice tube means operatively connected with said fuel outlet means and having a length and transverse dimensions correlated for discharging fuel accurately at the same rate and in the same increments as fuel is received from the pump structure for directing said intermittent flow of fuel into said engine in the immediate vicinity of a cylinder air inlet for enabling the fuel to be swept into the cylinder along with fresh air and to vaporize within the cylinder and in contact with fresh air with which it is to be burned.

2. An apparatus, as defined in claim 1, wherein said means for adjusting said valve member comprises pressure responsive means connectable with the engine manifold, a lever having one end connected with said valve member and an opposite end connected with said pressure responsive means, means pivotally supporting said lever intermediate its ends, and means for adjusting said supporting means diagonally in response to a factor causing a change in air density.

3. A pump structure comprising means providing a bore, a hydraulically operable piston axially slidably disposed within said bore and substantially sealing said bore and being free of any peripheral connection with said body means, means for reciprocating the piston including means communicating with said bore at one end of said piston for intermittently supplying pulses of measured quantities of hydraulic fluid under pressure for displacing the piston through successive pumping strokes having a length determined in accordance with said measured quantities, inlet and outlet means for fluid to be pumped communicating with said bore and an end of said piston opposite from one end, and said piston including annular groove means therein intermediate ends thereof for relieving pressure in any fluid tending to leak past the piston.

4. A pump structure comprising means providing a bore, a hydraulically operable piston axially slidably disposed within said bore and substantially sealing said bore and being free of any peripheral connection with said body means, means for reciprocating the piston including means communicating with said bore at one end of said piston for intermittently supplying pulses of measured quantities of hydraulic fluid under pressure for displacing the piston through successive pumping strokes having a length determined in accordance with said measured quantities, inlet and outlet means for fluid to be pumped communicating with said bore and an end of said piston opposite from one end and valve seat means between said bore and said means for supplying pulses of hydraulic fluid, said one end of said piston including a valve portion engageable with said valve seat means for preventing leakage of said fluid to be pumped past the piston upon completion of a suction stroke of the piston.

5. A pump structure, as defined in claim 4, wherein said piston includes annular groove means in a peripheral surface thereof intermediate its ends for relieving pressure in any fluid tending to leak past the piston.

6. A pump structure, as defined in claim 5, wherein said inlet and outlet means respectively include check valve means for controlling the flow of fluid being pumped, and said means for supplying pulses of hydraulic fluid comprises porting pump means.

7. A pump structure comprising means providing a bore, a hydraulically operable piston axially slidably disposed within said bore and substantially sealing said bore and being free of any peripheral connection with said body means, means for reciprocating the piston including means communicating with said bore at one end of said piston for intermittently supplying pulses of measured quantities of hydraulic fluid under pressure for displacing the piston through successive pumping strokes having a length determined in accordance with said measured quantities, inlet and outlet means for fluid to be pumped communicating with said bore and an end of said piston opposite from one end, and spring means engageable with said piston means for biasing the piston means through a suction stroke thereof for maintaining a pressure drop from the hydraulic fluid side of said piston to the fluid to be pumped during the suction strokes.

8. A pump structure comprising means providing a bore, a hydraulically operable piston axially slidably disposed within said bore, means communicating with said bore at one end of said piston for supplying pulses of hydraulic fluid under pressure for actuating said piston through successive pumping strokes, inlet and outlet means for fluid to be pumped communicating with said bore at an end of said piston opposite from said one end, said means for supplying pulses of hydraulic fluid under pressure comprises means providing a second bore, a second piston in said second bore and reciprocable through pumping and suction strokes of fixed length, port means connecting said second bore with a source of hydraulic fluid to be acted upon by said second piston, an adjustable valve member disposed for opening and closing said port means for controlling the effective length of the second piston pumping stroke, controller means for adjusting said valve member and changing the output of the pump structure, said controller means including an actuating member, a lever having one end portion connected with said valve member and an opposite end portion connected with said actuating member, a pivot element pivotally supporting said lever intermediate the ends of the lever, and means responsive to a predetermined factor for adjusting said pivot element diagonally of said lever for providing a percentage correction in the output of the pump structure for changes in said factor.

9. An apparatus for supplying liquid fuel to an internal combustion engine having a plurality of cylinders comprising a metering pump structure including body means having a first set of bores therein arranged around an axis, a hydraulic fluid reservoir in said body means, a first set of pistons respectively reciprocably disposed within said bores, a plurality of port means respectively connecting said bores and said reservoir and facing said axis, means engaging said pistons for mechanically successively driving said pistons through a pumping stroke of fixed length in timed relationship with engine speed, an axially adjustable valve member rotatable about said axis for successively closing and opening said port means for controlling the effective length of the pumping stroke of the pistons and thereby determining measured quantities of hydraulic fluid intermittently displaced by each piston during its effective pumping stroke, means for adjusting said valve member in accordance with weight of air intake into the engine, said body means having a second set of bores therein, a set of hydraulically operable pistons respectively axially slidably disposed in said second bores and being free of peripheral connections with said body means, a plurality of passageway means respectively communicating with said port means and connecting said first bores with said second bores at first ends of said second pistons for directing said measured quantities of hydraulic fluid from said first bores into said second bores for actuating said second pistons, the length of the pumping stroke of said second pistons being determined by said measured quantities of hydraulic fluid, a plurality of fuel inlet means and a plurality of fuel outlet means respectively connected with said second bores at ends of said second pistons oppositely disposed from said passageway means, a plurality of first and second axially shiftable check valve means respectively disposed in said fuel inlet means and said fuel outlet means, and a plurality of tube means respectively operatively connected with said second outlet means for discharging fuel in the immediate vicinities of cylinder air inlets and enabling the fuel to enter the cylinders along with fresh air, each of said tube means including a discharge opening and outwardly facing valve seat surrounding and confining said opening, a valve element including an enlarged portion axially engageable with said seat and a reduced diameter stem extending axially through said opening, and a tension spring connected to an inner end of said stem for biasing the valve element against said seat.

10. An apparatus for supplying liquid fuel to an internal combustion engine having a plurality of cylinders, a metering pump structure including body means having a first set of bores therein arranged around an axis, a central hydraulic fluid reservoir in said body means, a first set of pistons respectively reciprocably disposed within said bores, a plurality of port means respectively connecting said bores and said reservoir and facing said axis, means engaging said pistons for mechanically successively driving said pistons through a pumping stroke of fixed length, an axially adjustable valve member rotatable about said axis for successively closing and opening said port means for controlling the effective length of the pumping stroke of the pistons and thereby determining measured quantities of hydraulic fluid intermittently displaced by each of said pistons, said body means having a second set of bores therein, a set of hydraulically operable pistons respectively axially slidably disposed in said second bores and substantially sealing said second bores and being free of any peripheral connection with said body means, a plurality of passageway means respectively communicating with said port means and connecting said first bores with said second bores at first ends of said second pistons for directing said measured quantities of hydraulic fluid from said first bores into said second bores for actuating said second pistons, the length of the pumping stroke of said second pistons being determined by said measured quantities of hydraulic fluid, a plurality of fuel inlet means and a plurality of fuel outlet means respectively connected with said second bores at ends of said second pistons oppositely disposed from said passageway means, and a plurality of first and second axially shiftable check valve means respectively disposed in said fuel inlet means and said fuel outlet means.

11. A pump structure comprising means providing a bore, a hydraulically operable piston axially slidably disposed within said bore and substantially sealing said bore and being free of any peripheral connection with said bore means, means communicating with said bore at one end of said piston for supplying measured pulses of predetermined quantity of hydraulic fluid under pressure for actuating said piston through successive strokes having a length determined by said quantity of each of said pulses, inlet and outlet means for fluid to be pumped communicating with said bore at an end of said piston opposite from said one end, and means positively maintaining a pressure drop from the hydraulic fluid side of said piston to the fluid to be pumped during the suction strokes.

12. In a fuel system for an engine having a plurality of cylinders, pump means for delivering intermittent measured pulses of predetermined quantities of fuel under pressure, and means connected with said pump means for distributing said fuel to said engine cylinders, said distributing means comprising a plurality of elongated orifice tubes having discharge openings and each having a very small generally uniform internal diameter and a very long length as compared with its internal diameter and providing a very substantial resistance to fuel flow and maintaining the pressure of fuel pulses flowing therein and promoting intermittent discharge of quantities of fuel substantially in accordance with the quantities intermittently delivered by said pump means.

13. A fuel system, as defined in claim 12, wherein all of said tubes have substantially the same length, and said internal diameter is on the order of about .025 inch.

References Cited by the Examiner

UNITED STATES PATENTS

| | | | |
|---|---|---|---|
| 2,511,213 | 6/1950 | Leslie | 123—119 X |
| 2,605,710 | 8/1952 | Mashinter | 103—37 |
| 2,676,603 | 4/1954 | Kollsman | 123—119 X |
| 2,807,252 | 9/1957 | Downing | 123—140 |
| 2,843,045 | 7/1958 | Mashinter | 103—37 X |
| 2,892,453 | 6/1959 | Stoll | 123—139.17 |
| 2,893,365 | 7/1959 | Haefner | 123—119 |
| 2,958,290 | 11/1960 | Bessiere | 123—139 X |
| 2,969,784 | 1/1961 | High | 123—139.17 |
| 2,989,957 | 6/1961 | Means | 103—38 X |
| 2,990,826 | 7/1961 | Dolza | 123—139.17 |
| 3,020,905 | 2/1962 | Goschel et al. | 123—139.17 |
| 3,058,425 | 10/1962 | Evans | 103—2.1 |
| 3,070,030 | 12/1962 | Mashinter | 103—173 X |

MARK NEWMAN, *Primary Examiner.*

RICHARD B. WILKINSON, *Examiner.*